(12) United States Patent
Qiao et al.

(10) Patent No.: US 10,115,942 B2
(45) Date of Patent: Oct. 30, 2018

(54) RATE-SENSITIVE AND SELF-RELEASING BATTERY CELLS AND BATTERY-CELL STRUCTURES AS STRUCTURAL AND/OR ENERGY-ABSORBING VEHICLE COMPONENTS

(71) Applicant: The Regents of the University of California, Oakland, CA (US)

(72) Inventors: Yu Qiao, San Diego, CA (US); Meng Wang, La Jolla, CA (US); Weiyi Lu, La Jolla, CA (US)

(73) Assignee: The Regents of the University of California, Oakland, CA (US)

(*) Notice: Subject to any disclaimer, the term of this patent is extended or adjusted under 35 U.S.C. 154(b) by 323 days.

(21) Appl. No.: 14/893,895

(22) PCT Filed: Jun. 5, 2014

(86) PCT No.: PCT/US2014/041035
§ 371 (c)(1),
(2) Date: Nov. 24, 2015

(87) PCT Pub. No.: WO2014/197666
PCT Pub. Date: Dec. 11, 2014

(65) Prior Publication Data
US 2016/0133899 A1 May 12, 2016

Related U.S. Application Data

(60) Provisional application No. 61/831,455, filed on Jun. 5, 2013.

(51) Int. Cl.
*H01M 2/10* (2006.01)
*H01M 2/34* (2006.01)
(Continued)

(52) U.S. Cl.
CPC ....... *H01M 2/1077* (2013.01); *B60L 11/1864* (2013.01); *B60L 11/1879* (2013.01);
(Continued)

(58) Field of Classification Search
CPC .... H01M 2/1077; H01M 2/347; H01M 2/348; H01M 10/4207; H01M 10/0481;
(Continued)

(56) References Cited

U.S. PATENT DOCUMENTS 4,174,014 A 11/1979 Bjorksten
5,156,225 A 10/1992 Murrin
(Continued)

FOREIGN PATENT DOCUMENTS

WO    WO2011038855 A1    4/2011

OTHER PUBLICATIONS

Notification of Transmittal of the International Search Report and the Written Opinion of the International Searching Authority for PCT/US2014/041035 dated Dec. 3, 2014, 17 pages.
(Continued)

*Primary Examiner* — Eugenia Wang
(74) *Attorney, Agent, or Firm* — Fish & Richardson P.C.

(57) ABSTRACT

A battery system includes a load bearing structure having battery cells, or structures formed by battery cells, and at least one mechanical switch, and an electrical connection coupled with the battery cells of the load bearing structure. A battery has a rate-sensitive component that is configured to deform into a first state to provide a first reaction force under a mechanical loading of a first magnitude. The rate-sensitive component is configured to deform into a second state to provide a second reaction force under a mechanical loading of a second magnitude.

12 Claims, 27 Drawing Sheets

(51) Int. Cl.
  *H01M 10/42*   (2006.01)
  *B60L 11/18*   (2006.01)
  *H01M 10/04*   (2006.01)
  *H01M 10/058*  (2010.01)
  *H01M 10/0525* (2010.01)
  *H01M 4/62*    (2006.01)

(52) U.S. Cl.
  CPC .......... *H01M 2/347* (2013.01); *H01M 2/348* (2013.01); *H01M 4/62* (2013.01); *H01M 10/0481* (2013.01); *H01M 10/058* (2013.01); *H01M 10/0525* (2013.01); *H01M 10/4207* (2013.01); *H01M 10/4235* (2013.01); *H01M 2200/10* (2013.01); *H01M 2220/20* (2013.01); *Y02E 60/122* (2013.01); *Y02T 10/7011* (2013.01)

(58) Field of Classification Search
  CPC .............. H01M 2220/20; H01M 4/62; H01M 10/4235; H01M 10/058; H01M 10/0525; H01M 2200/10; B60L 11/1879; B60L 11/864; Y02E 60/122; Y02T 10/711
  See application file for complete search history.

(56) References Cited

U.S. PATENT DOCUMENTS

| | | | |
|---|---|---|---|
| 2001/0014417 A1* | 8/2001 | Etou | H01M 2/0242 429/66 |
| 2007/0020516 A1 | 1/2007 | Yoon | |
| 2009/0145676 A1 | 6/2009 | Takasaki | |
| 2011/0195284 A1* | 8/2011 | Yasui | H01M 2/0242 429/82 |
| 2012/0261206 A1 | 10/2012 | Yasui | |
| 2013/0017426 A1* | 1/2013 | Yahagi | H01M 2/1055 429/96 |
| 2013/0049649 A1 | 2/2013 | Park | |
| 2015/0222131 A1* | 8/2015 | Kano | H02J 7/0013 320/112 |

OTHER PUBLICATIONS

Notification Concerning Transmittal of International Preliminary Report on Patentability, International Application No. PCT/US2014/041035, dated Dec. 17, 2015, 8 pages.

* cited by examiner

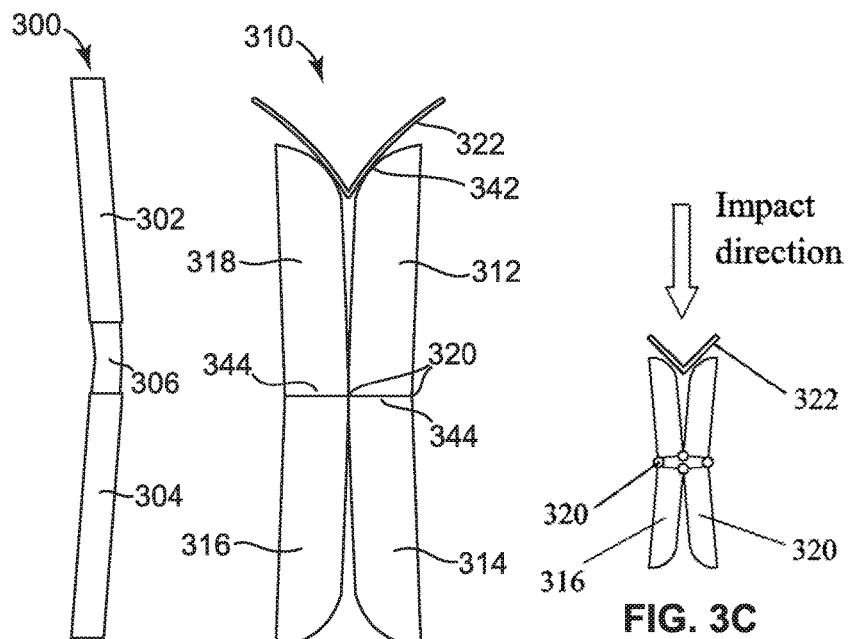
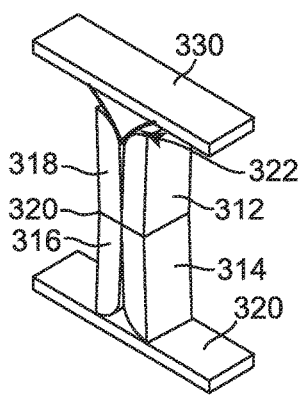
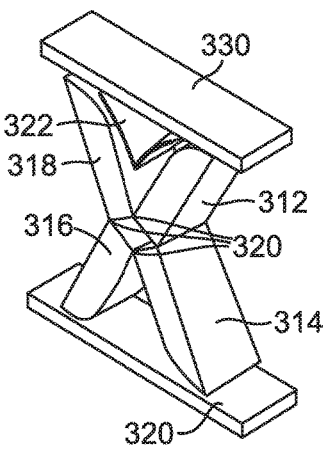
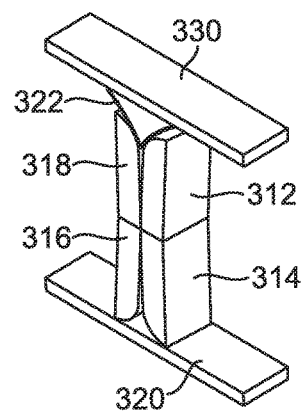

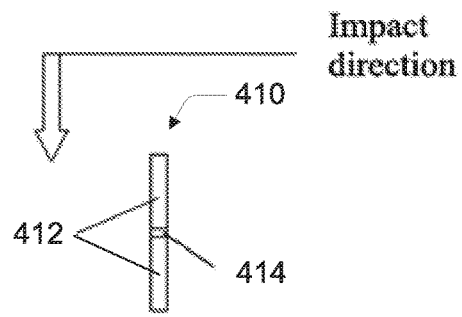
FIG. 4A
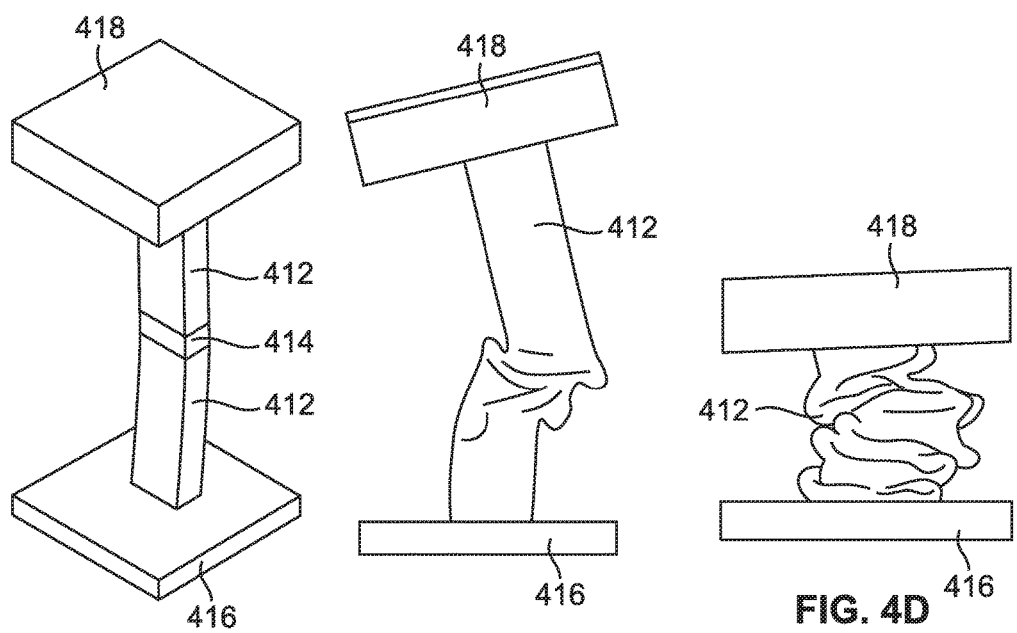
FIG. 4B  FIG. 4C  FIG. 4D

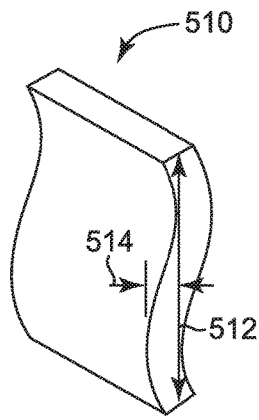
FIG. 5A
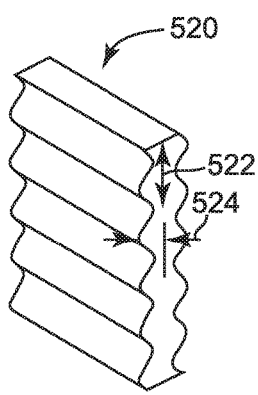
FIG. 5B
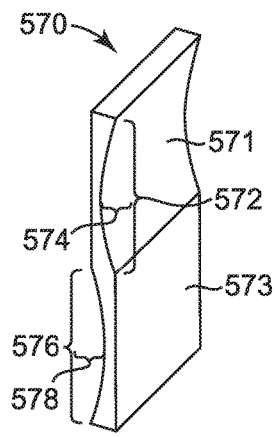
FIG. 5C
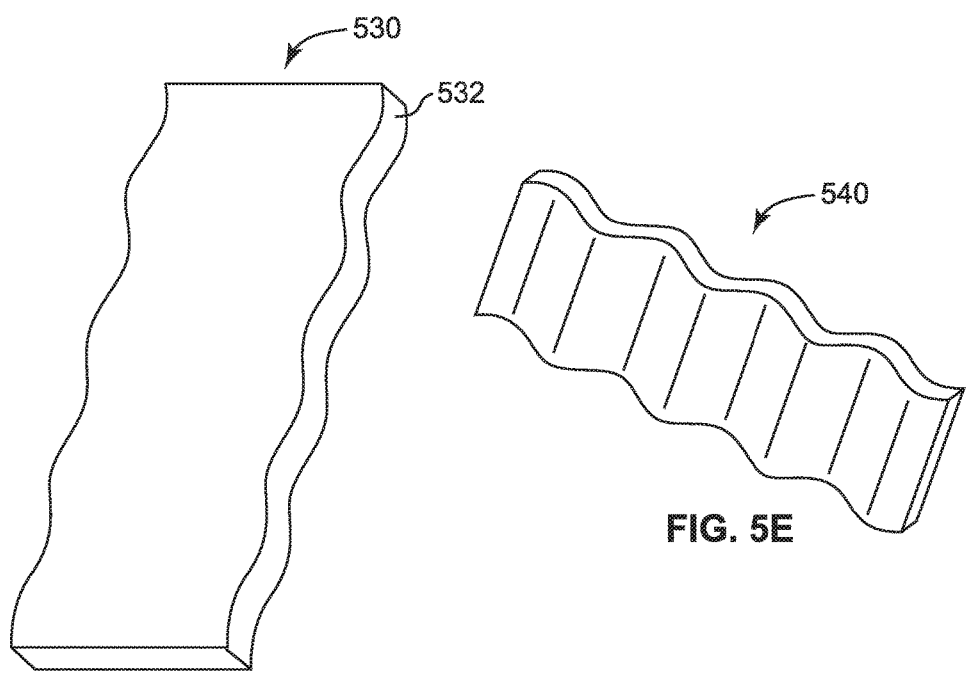
FIG. 5D
FIG. 5E

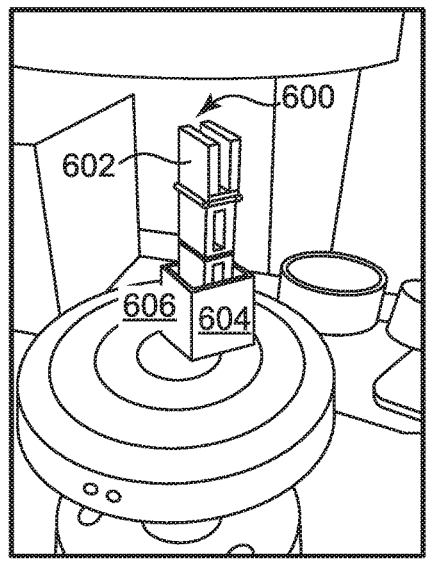
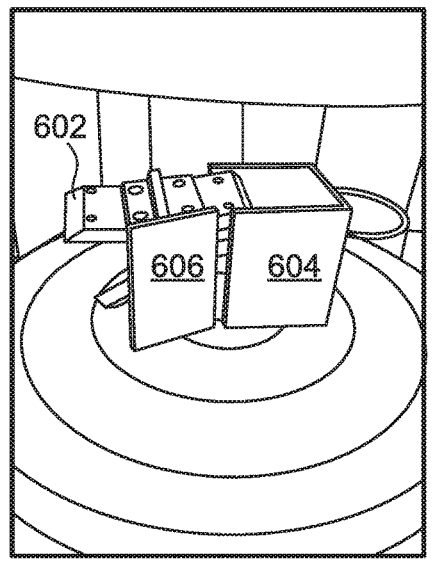
FIG. 6A     FIG. 6B
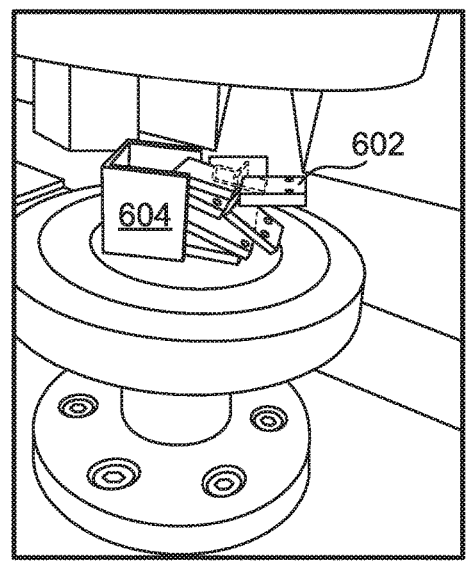
FIG. 6C

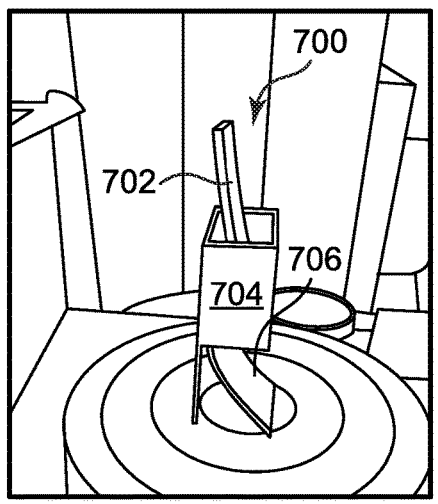 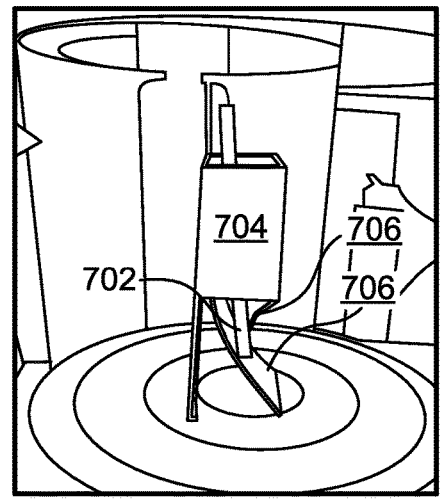
FIG. 7A  FIG. 7B
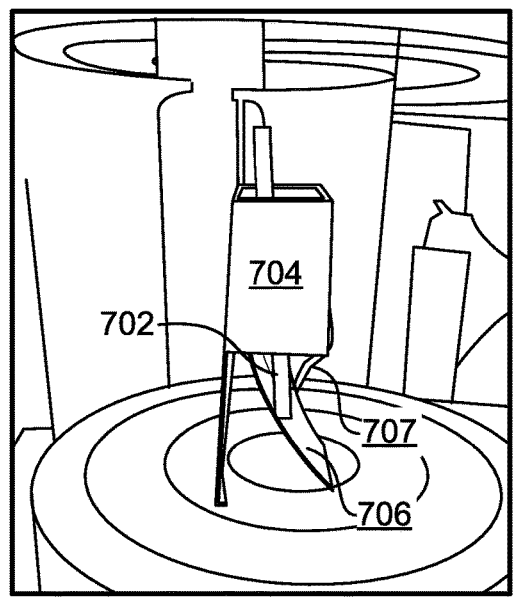
FIG. 7C

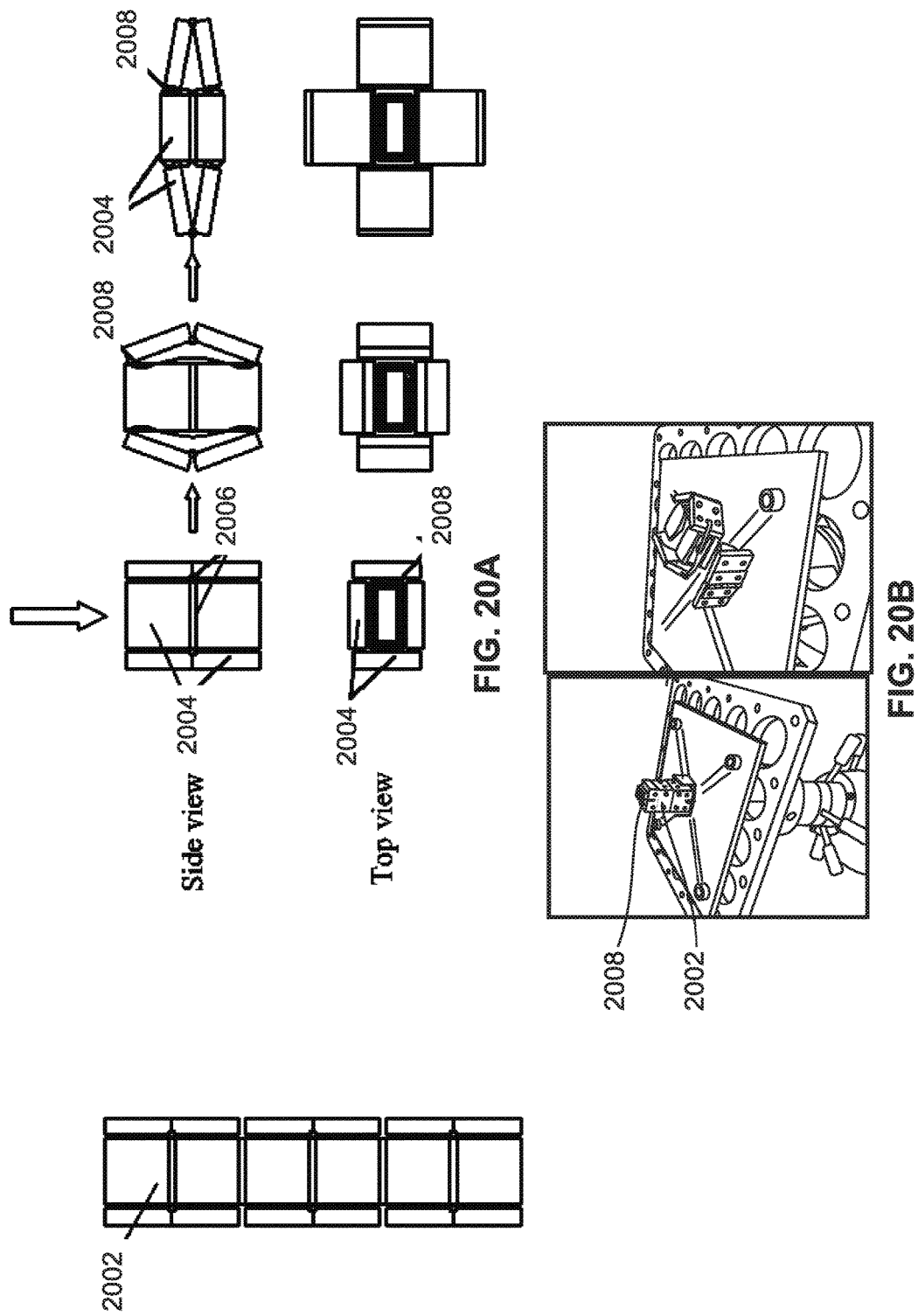

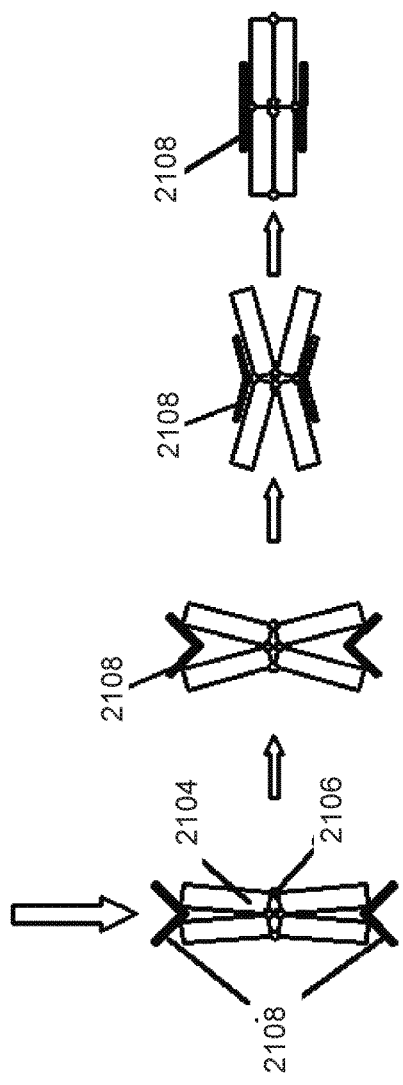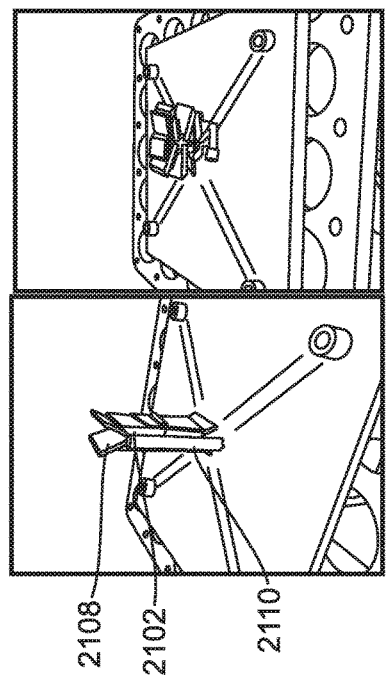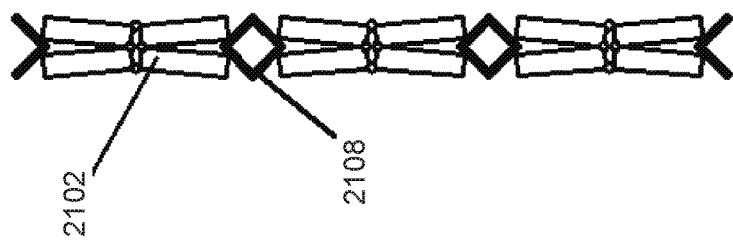
FIG. 21A
FIG. 21B

RATE-SENSITIVE AND SELF-RELEASING BATTERY CELLS AND BATTERY-CELL STRUCTURES AS STRUCTURAL AND/OR ENERGY-ABSORBING VEHICLE COMPONENTS

CROSS-REFERENCE TO RELATED APPLICATIONS

This application is a U.S. National Stage of International Application No. PCT/US2014/041035 entitled "RATE-SENSITIVE AND SELF-RELEASING BATTERY CELLS AND BATTERY-CELL STRUCTURES AS STRUCTURAL AND/OR ENERGY-ABSORBING VEHICLE COMPONENTS" and filed Jun. 5, 2014, which claims priority to U.S. Application Ser. No. 61/831,455 filed on Jun. 5, 2013, both of which are incorporated herein by reference. This patent application is related to U.S. Application Ser. No. 61/831,437 filed on Jun. 5, 2013, and entitled, "Using Solid and/or Capsule Damaging Initiators in Battery Electrodes to Mitigate Thermal Runaway", and PCT application filed on the same day as this application, titled "Mitigating Thermal Runaway in Lithium Ion Batteries Using Damage-Initiating Materials or Devices", both of which are hereby incorporated by reference.

FEDERALLY SPONSORED RESEARCH OR DEVELOPMENT

The invention was made with government support under DE-AR0000396 awarded by the Department of Energy. The government has certain rights in this invention.

BACKGROUND

Currently, there are four widely used battery cell structures: button/coin cell, cylindrical cell, prismatic cell, and pouch cell. For the relatively small button/coin cell, usually one layer of anode is separated from the cathode by a thin film separator. The three layers are sealed in a metal case. The other three structures follow the wound design; i.e., electrodes and separator are cut into sheets, layered, and wound into spiral rolls or flatten rolls, which are sealed by metal or plastic containers. All these cells can be used in electric vehicles (EV), and a few special cell structures have sometimes been employed. For example: the inner structure of wound electrodes and separators can be redesigned by applying various stack and fold patterns; low aspect ratio tube cell structures have been proposed for better thermal management; battery cases have been redesigned and case materials selected to lower internal resistance, improve thermal management, simplify cell assembly, or reduce cell mass density. Special deformable and displaceable battery packs have been designed to absorb energy in a vehicle collision. Battery cells and battery structures can be designed to improve the performance of batteries as an electrical component. For example, by increasing their power capacity and density, extending battery life, improving the usage of space, and improving battery safety, etc.

Casualties can result when conventional battery cells are crushed at a very high deceleration in a crash event. Proposals for load carrying battery cells have generally centered on strengthening of battery materials.

SUMMARY

The methods and systems described herein configure battery cells as structural components that can be load carrying and also be used for energy absorption. These methods and systems can fulfill important functional requirements and be, for example, rate-sensitive such that reaction forces from the systems vary based on a velocity of impact. The methods and systems also have the ability to actively self-release and self-folding or self-unfolding. The methods and battery systems described herein have a large deformation and displacement capacity.

Battery-cell structures are defined as one-dimensional (1D), two-dimensional (2D), or three-dimensional (3D) structures composed of battery cells, such as trusses or arrays, with or without connections, which have both energy absorption and load carrying capabilities.

The structures of cell components or cells can be, for example, self-centering devices, arrays of tubes and rods, liquid dampers, multilayer plates, components that slide along guiding rails/walls/channels/tracks, etc. As the relatively hard cells have relative motions, energy can be dissipated without much cell damage, while the cell structure (module and/or pack) collapses. The cell or cell structures can be designed to be anisotropic and/or heterogeneous, so that when a mechanical loading is applied, different components can move along different directions in different manners.

Disclosed are structures, components and methods that pertain to the design, configuration, and assembly of battery cells as structural components that can also absorb energy, carry load, or perform other related functions. To adjust the working pressure (i.e., the pressure at which the battery cells or battery-cell structures carry out these functions), and the associated deformability of battery cells or battery-cell structures, their external and/or inner walls can be made to be curved along an expected loading direction. Alternatively, vacant space can be designed into the cells or cell structures (e.g., tubes), so that buckling can happen upon a sufficiently large external loading. The battery cells can be used as major structural parts of an electrical vehicle (EV) or other systems using electric power such that the battery cells absorb a considerable portion of impact energy during a collision. As a result of the battery cells being used as structural components in a vehicle, the auto frame can be less heavy and bulky, thus reducing overall vehicle weight and cost.

A battery-cell releasing system can be designed to further protect battery cells and occupants. In a crash event, crushing of battery cells can be avoided or optimized with the installation of battery cell releasing system. Such a battery cell releasing system enables the battery cells to be released from a battery system or car components to safe locations, or to critical locations, such as the places in the stress wave transmission path, so as to best protect the occupants. The orientations of battery cells can be optimized as well. Battery cells or battery cell structures in the systems disclosed herein are able to be released from the battery system or a component of a car in one or multiple directions in a controlled way. The control method for the release of the battery cells can be passive (i.e., using no extra energy) or active (i.e., can use extra energy to perform the function). A cell collection system for collecting and protecting released cells is optional.

In one aspect, battery systems described herein include a load bearing structure that includes battery cells and at least one mechanical switch, and an electrical connection coupled with the battery cells of the load bearing structure.

Implementations can include one or more of the following features. The battery system can include connecting elements between the battery cells. The at least one mechanical switch is configured to transmit energy to the battery cells.

The plurality of battery cells is configured and arranged to absorb energy when changing from a first arrangement into a second arrangement upon mechanical loading. The second arrangement produces a reaction stress different from the first arrangement. The battery cells includes battery cells connected pairwise by a corresponding connecting element, the connecting element can include a hinge. The second arrangement includes a truss and extends over a larger volume than the first arrangement, and the second arrangement is configured to provide a higher reaction force than the first arrangement.

The load bearing structure includes a lattice and the lattice is configured to change to the second arrangement when impacted at a first impact velocity. The structure is configured to change to a third arrangement when impacted at a second impact velocity. The second impact velocity being higher than the first impact velocity. The at least one mechanical switch is configured to be crushed at or above the second impact velocity and the structure is configured to produce a higher reaction stress in the third arrangement than in the first arrangement or the second arrangement. The at least one mechanical switch is configured to slide the plurality of battery cells in a direction orthogonal to the mechanical loading to form the second arrangement.

The battery system can include a container configured to receive the battery cells in the second arrangement. The second arrangement is more compressed than the first arrangement. The battery system includes module walls surrounding the battery cells in the first arrangement and a cell releasing system connecting the module walls to the container. The battery cells are configured to slide out of the module walls through the cell releasing system and into the container upon mechanical loading. A width of the container is configured to change to accommodate the battery cells in the second arrangement. The battery system includes cell cases each enclosing a corresponding one of the battery cells. The battery cells are arranged in two rows in the first arrangement, and upon mechanical loading, the battery cells in the two rows are configured to be interleaved to form one row of battery cells in the second arrangement. The at least one mechanical switch is separated from at least a portion of the load bearing structure.

In one aspect, batteries described herein include a rate-sensitive component. The rate-sensitive component is configured to deform into a first state to provide a first reaction force under a mechanical loading of a first magnitude, and the rate-sensitive component is configured to deform into a second state to provide a second reaction force under a mechanical loading of a second magnitude.

Implementations can include one or more of the following features. The rate-sensitive component is a structural component of the battery, or a part of the battery, the rate-sensitive component is crushed in the second state and the second reaction force is larger than the first reaction force.

In one aspect, battery cells described herein include walls having an undulating profile. A wavelength and an amplitude of the undulating profile along a loading direction are configured to absorb impact energy and to decrease deceleration of the battery cell in a collision, the battery cell having a first compressibility and is configured to provide a reaction force plateau.

Implementations can include one or more of the following features. An electric vehicle includes the battery cell, the battery, or the battery system described herein.

In one aspect, methods described herein include using a battery as a load bearing structure in an electric vehicle. The battery includes battery cells; and using the battery to absorb energy during a collision by rearranging the battery cells arranged in a first arrangement into a second arrangement.

Implementations can include one or more of the following features. The method includes guiding the battery into a battery collection system during or after a collision. The method includes using a switch to control a response of the battery based on an impact velocity of the collision. The battery cells rearranges into the second arrangement when the switch is crushed by the impact velocity of the collision. The load bearing structure undergoes self-folding or self-unfolding upon mechanical loading. The battery cells are connected by connectors. The connectors include hollow tubes or profiled hollow components. The battery cells are freely jointed in a self-folding or self-unfolding configuration. The self-folding or self-unfolding occurs by displacement of the battery cells. The self-folding or self-unfolding configuration includes arrays or X-shaped structures.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 3A shows a cell structure.
FIG. 3B shows a cell structure.
FIG. 3C shows a schematic of a cell structure.
FIG. 3D shows a simulation of a cell structure before impact.
FIG. 3E shows a simulation of the cell structure of FIG. 3D at a low impact velocity.
FIG. 3F shows a simulation of the cell structure of FIG. 3D at a high impact velocity.
FIG. 4A shows a cell having a self-contained rate-sensitive component.
FIG. 4B shows a simulation of the cell structure of FIG. 4A before impact.
FIG. 4C shows a simulation of the cell structure of FIG. 4A at a low impact velocity.
FIG. 4D shows a simulation of the cell structure of FIG. 4A at a high impact velocity.
FIG. 5A shows a battery cell having an undulating profile.
FIG. 5B shows a battery cell having an undulating profile.

FIG. 5C shows a battery cell having an asymmetric profile.

FIG. 5D shows a battery cell having wavy walls.

FIG. 5E shows a battery cell having wavy walls along two orthogonal directions.

FIG. 6A shows a battery self-releasing system.

FIG. 6B shows the battery self-releasing system of FIG. 6A after cell structures have been compressed.

FIG. 6C shows the battery self-releasing system of FIG. 6A after cell structures have been compressed.

FIG. 7A shows a battery self-releasing system having a guiding path.

FIG. 7B shows the battery self-releasing system of FIG. 7A having a cell on the guiding path.

FIG. 7C shows the battery self-releasing system of FIG. 7A after impact.

FIG. 20A shows a schematic of a self-unfolding cell structure.

FIG. 20B shows an eight-cell unit before (left) and after (right) an impact.

FIG. 21A shows a schematic of a self-folding cell structure.

FIG. 21B shows a cell structure before (left) and after (right) an impact.

DETAILED DESCRIPTION

Figure 1:
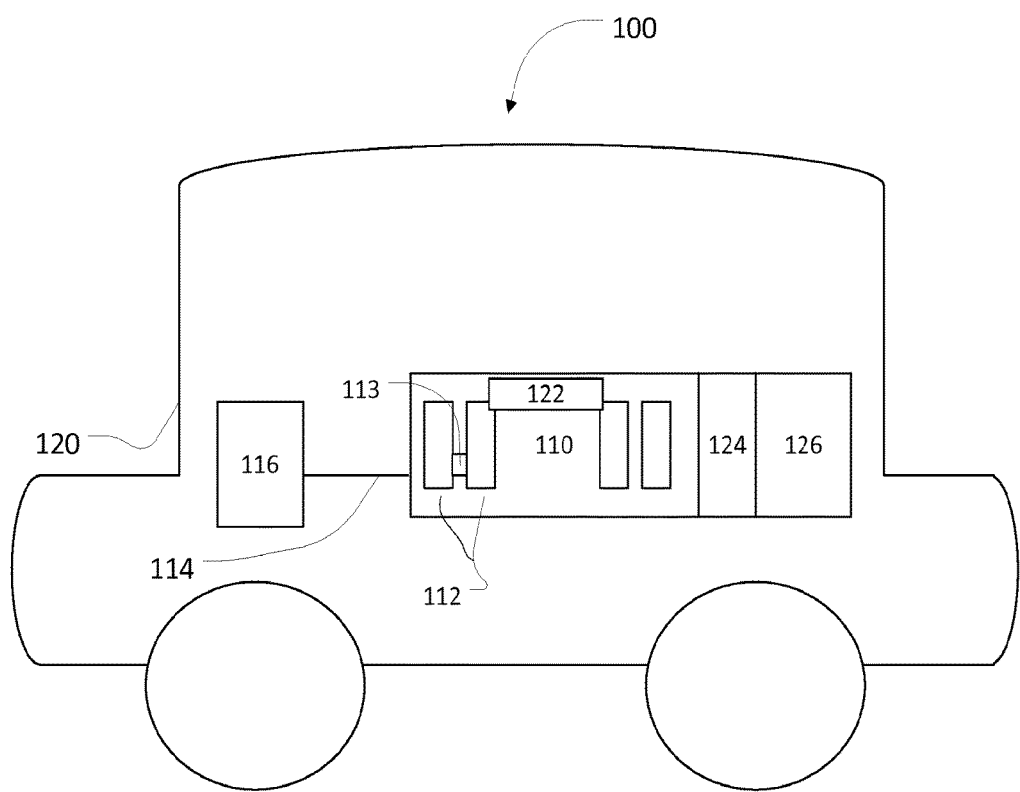
FIG. 1 shows a schematic diagram of an electric vehicle.

FIG. 1 shows an electric vehicle (EV) 100 having a battery cell structure 110 that is load bearing. The load bearing cell structure can serve as a structural part of the EV 100, helping to save material cost and reduce the weight of the EV, as structural components 120 (e.g., a frame) of the EV can be made to be less heavy and less bulky. The cell structure 110 includes one or more battery cells 112. A connection part 113 can be used to mechanically connect two or more battery cells 112. The cell structure 110 has electrical connections 114 to power, for example, a motor 116 of the EV 100.

The cell structure 110 can be a rate-sensitive battery cell or battery-cell structure, which means that the cell structure 100 is able to provide different stress-strain and/or force-displacement relationships under different impact velocities. Such a rate-sensitive battery cell or cell structure is load-carrying in normal operation and can behave differently in a collision depending on the velocity of the collision. The failure modes or deformation configurations of the cell structure 110, the battery cells 112 can vary depending on the impact velocity. For example, under a relatively low impact velocity, the cell structure 110, the battery cell structures can collapse to protect battery cells 112 from potential damages and simultaneously providing a relatively low reaction force (e.g. below 3-4 MPa), so that the battery cells 112 are undamaged and can be reused or recycled. At high-velocity impacts, the cell structure 110 can absorb a considerably portion of impact energy and can respond in a way that best protects occupants of the EV. For example, the battery cells 112, the cell structure 110, or battery case structures can provide higher reaction forces as additional protection for occupants. Energy can be dissipated (e.g., absorbed) when the cells 112 and cell structures 110 undergo friction, stiction, locking, or sliding as an external mechanical loading is applied.

The EV 100 can also include self-releasing components 124, which help move the battery cells 112 such that they can be collected in a safe collection system 126 and/or be moved to critical locations, e.g. the places where the collision stresses are high and would benefit most from energy absorption. The cell structure 100 can be arranged such that battery cells 112 are reoriented to optimum configurations as external mechanical loadings are applied, depending on the functional requirements for the specific EV and battery cell structures. The EV 100 can also include a switch 122 that is in mechanical contact with the cell structure 110. The switch can help control the response of the cell structure under impacts of different velocities.

Figure 2A:
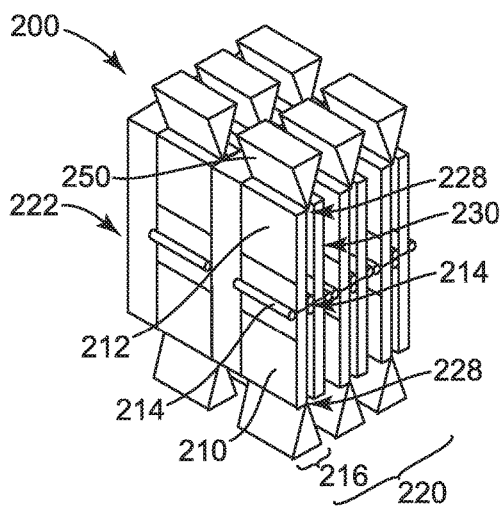
FIG. 2A shows a cell structure in a first configuration.
Figure 2B:
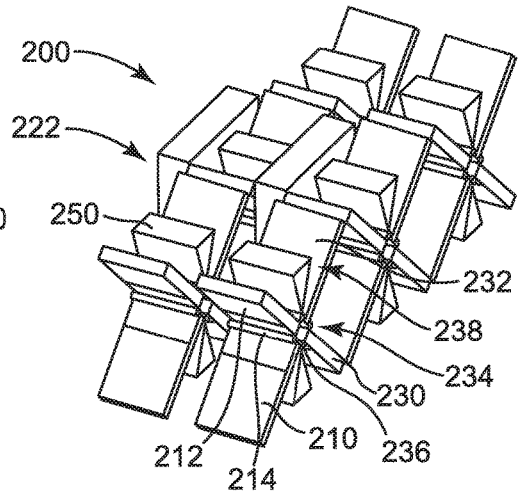
FIG. 2B shows the cell structure of FIG. 2A in a second configuration.

FIG. 2A shows a cell structure 200 in a first configuration. FIG. 2B shows the cell structure 200 deployed in a second configuration, as a truss or a truss component. The cell structure 200 includes battery cells 210 and 212. An upper end of cell 210 is mechanically connected using a mechanical connection (e.g., a hinge 214) with a lower end of the cell 212 to form a pairwise unit. The hinge 214 allows the cells 210 and 212 to be connected at a joint, or a node. A second pairwise unit can be formed by joining a bottom end of a cell 232 to a top end of cell 230 using a hinge 234. The two pairwise units can be connected using hinges 236 and 238. The hinge 234 connects the bottom ends of both cells 212 and 232, while the hinge 236 connects the top ends of cells 210 and 230 to form a truss unit 216. Planar surfaces of cells 212 and 232 can be arranged to be parallel to each other in the first configuration. In the cell structure 200 shown in FIG. 2A, three truss units 216 form a row 220. Interposed between the row 220 and an adjacent row is a module wall 222, which can serve as an energy absorption layer.

Mechanical switches (not shown in the figure) can be placed on top and at bottom of a gap 228 between adjacent cells 212 and 232, and 210 and 230, respectively.

Figure 2C:
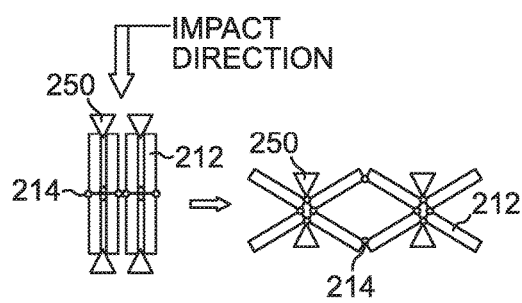
FIG. 2C shows a cell structure in two configurations.

FIG. 2C shows a schematic diagram of the sideway sliding of the structural members 212 connected by mechanical connections 214 (e.g., a hinge) along a direction 213 as a result of an impact along an orthogonal direction. Crushing of the structural members 212, which model battery cells, is avoidable. For example, the cell structure 200 can extend over a larger volume when the structural members 212 undergo sideway sliding.

Figure 2F:
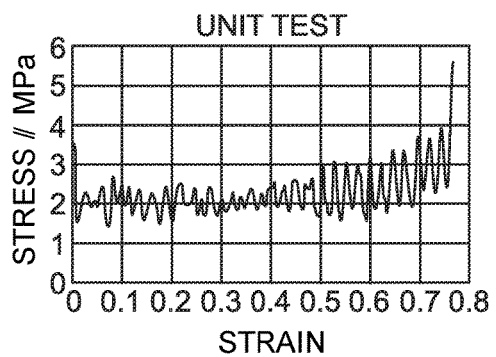
FIG. 2F shows a stress-strain plot of the cell structure of FIGS. 2D and 2E.
Figure 2D:
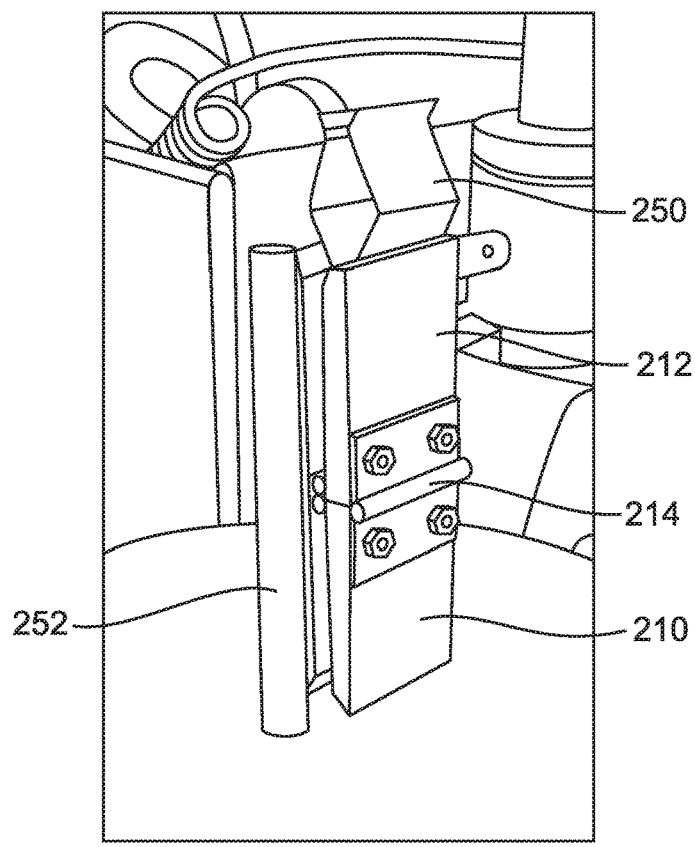
FIG. 2D shows a cell structure in a first configuration.
Figure 2E:
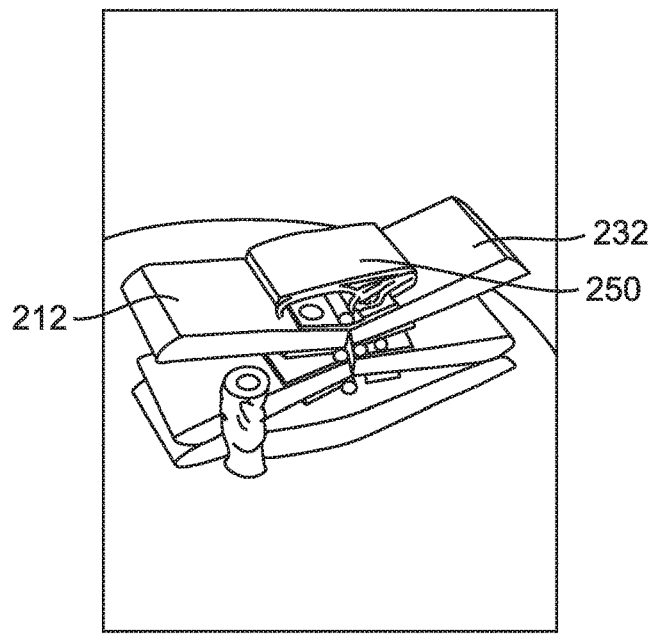
FIG. 2E shows the cell structure of FIG. 2D in a second configuration.

A model battery cell is made from a solid block of aluminum 6016H6 having dimensions of 1.5"×1"×0.2". Four hinges 214, 234, 236, and 238 were bolted on the model cells 210, 212, 230, and 232 to form a truss unit 216. The cell truss 216 can correspond to a battery module or pack. A battery module can be a group of battery cells, a battery pack can be a group of battery modules, and a battery-cell structure can be either a battery module or a battery pack, or a part of a module or pack. A 1/32" thick hollow V-shaped wedge trigger 250 made of aluminum 6016H6 was placed at the opening 228 on the top. A model module-case-wall component was constructed using stainless steel 304 tubes with epoxy adhesive. The model module-wall component 252 was placed next to the cell truss, as shown in FIGS. 2D and 2E. The tube 256 was 3" in length, 1/4" in diameter, with the tube wall thickness of 0.02". As shown in FIG. 2F, quasi-static compression tests show the cell truss unit 216 successfully opening up with the aid of the V-shape wedge trigger 250; and the model module wall 254 provided a reaction stress of about 4 MPa. The quasi-static test was conducted by placing the testing sample in a type 5582 Instron machine, where a steel compression plate compressed the sample at a constant velocity of 1 mm/min. The sample deformation and the reaction force were measured by the linear variable differential transformer (LVDT) and the load cell of the Instron machine, respectively. During the compression process, the cell structure does not contribute to the reaction force; the reaction force mainly comes from the model module-wall component. The engineering reaction stress was calculated as the reaction force divided by the total initial cross-sectional area of the sample, including the cell structure and the model module-wall component. The engineering strain was calculated as the sample deformation divided by the initial sample height.

Figure 2G:
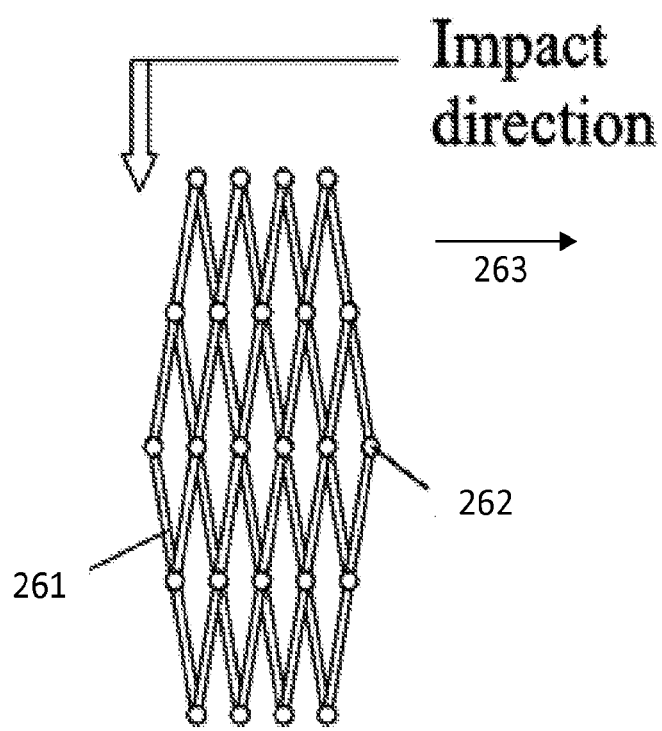
FIG. 2G shows a schematic of a cell structure.

FIG. 2G shows an embodiment in which multiple structural members 261 are connected via rate-sensitive connections 262, (e.g., joints or hinges) into an extended truss array in which the structural members can be deployed to slide in a direction 263, which is orthogonal to an impact direction in a low velocity impact and provide a low reaction force. In a high velocity impact scenario, the rate-sensitive connection 262 will be crushed, thus crushing structural members as the members collapse, which provides a high reaction force.

FIG. 3A shows a component of S-shaped cell structure 300 that includes structural members 302 and 304, which are connected by a joint 306. As a number of such wavy components are placed together, a S-shaped cell structure can be formed. Other cell structure geometries are possible, for example, cell structure or cell-structure component can be designed as a X-shaped cell lattice structure, e.g. FIG. 3B. Both structures 300 and 310 are examples of an impact rate sensitive battery-cell structure. X-shaped structure 310 includes a trigger or mechanical switch 322 to control rate-sensitive behaviors of the structure. X-shaped cell structure 310 includes four structural members 312, 314, 316 and 318, which are connected to one another by joints 320.

The structural members can be made of compressible materials and/or structures, such as hollow tubes or foams made of metallic materials, polymers, elastomers, ceramics, glass materials, carbon materials, composite materials, or combinations of these materials. The joints 306 and 320 can be either free-rotational hinges, which can rotate freely, or moment-resistance hinges, which provide reaction moments/forces when they rotate. The mechanical switch 322 can be made of a ductile material, such as metals, e.g. steels, copper alloys, aluminum alloys; or polymers, e.g. polypropylene, polystyrene, polyurethane, polyisoprene, polybutadiene, poly(vinyl chloride), polyethylene, nylon, polytetrafluoroethylene, polyester, epoxy, leather, wood, polyacrylates, polyimide, polycarbonate, polysulfone, silicone, and co-polymers; or brittle materials such as porous ceramic/glasses or hardened steels. The joints can have a L-shaped or an O-shaped configuration, or the joints can be formed of any other hollow structures, or a dashpot structure, which can include two or more moving parts that can have relative motions with respect to each other.

At a low impact velocity (e.g., lower than 16.5 m/s, or lower than 10 m/s) the mechanical switch 322 can help to deploy the lattice in such a way that the structural members 312-318 slide along directions orthogonal to the impact direction while providing a reaction stress of, for example, 2-4 MPa. The reaction stress helps absorb energy when the cells or cell-structures deform. At a high impact velocity (e.g., higher than 10 m/s, higher than 16.5 m/s, or higher than 20 m/s), the mechanical switch 322 can yield due to inertia-related dynamic effects so that sliding motions of the structural members are blocked. All the components, including the structural elements, can be crushed to provide a high reaction stress of, for example, 10 MPa. The reaction stress can be calculated over the entire cross-sectional area of the cell structure.

FIGS. 3D-3F show results from finite element analysis (FEA) conducted using ABAQUS/explicit package from Dassault Systèmes of France. FIG. 3D shows the model system prior to the application of any impact forces. Four 2"×1"×1/2" prismatic aluminum 6061H6 rectangular hollow tubes with round cuts 342 at contact surfaces with a bottom surface of impactor 330. The thickness of tube wall can, for example, be 1/16". Joints were simulated by coupling rotational degree of freedom at contact edges 344. The trigger 322 can be modeled as a 1/16" thick L-shaped wedge made of aluminum 6061H6. An impact mass 330 was set to 5 kg. The friction coefficient between the two surfaces was set to 0.3. The simulation results indicate that, under a low impact velocity of, for example, 8 m/s, the structural members 312, 314, 316, and 318 slide aside, as shown in FIG. 3E, driven by the mechanical switch 322, to provide a relatively low reaction stress of, for example, around 2 MPa. The greyscale rendering of the elements in FIG. 3E indicates the magnitude of reaction stress on the assembly. For example, FIG. 3E shows that the reaction stress can come mainly from the hinges 320.

Upon a high-velocity impact at, for example, 16 m/s, the mechanical switch 322 can be crushed, as shown in FIG. 3F. Consequently, structural components like the impact mass 330, the structural members, 312, 314, 316, and 318, and the switch 322 collapsed vertically, providing a higher reaction stress of 10 MPa. The high reaction stress is due to contributions from all four structural members, as show in FIG. 3F.

FIG. 3C shows another embodiment in which an additional mechanical switch 323 is placed between structural members 314 and 316. In this case, the structural members may not have rounded contact surfaces with the switches 322 and 323. In a low velocity impact, the rate-sensitive trigger (i.e., mechanical switch 323) will aid structural members 314 and 316 slide against each other to provide a low reaction. In a high velocity impact, the rate-sensitive trigger will be crushed, thus crushing the structural members 314 and 316 to provide a high reaction force.

Figure 3G:
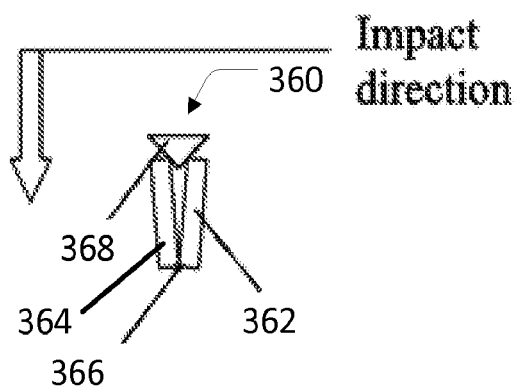
FIG. 3G shows a schematic of a cell structure.

FIG. 3G shows another embodiment in which only two structural members 362 and 364 are used to form a V-shaped assembly 360. A connection 366 (e.g., a hinge) is used to mechanically join the lower ends of structural members 362 and 364. A rate sensitive material part 368 aids structural members 362 and 364 in sliding against each other to provide a low reaction in a low velocity impact scenario. In a high velocity impact, the rate sensitive material part 368 will be crushed. The structural members 362 and 364 will then be crushed and collapse to provide a high reaction force.

FIG. 4A shows a schematic of an impact rate sensitive battery-cell case structure 410. The structure 410 is a rate sensitive structure having a self-contained rate sensitive component 414. The structure 410, can be made of, for example, an Al6061H6 rectangular hollow tube with a ½" by ½" cross section and the height of 4". The wall thickness can be, for example, ⅓₂". The tube 412 can contain a mid-span imperfection 414, of, for example, a length of ⅒", along with a slotted imperfection of ⅛" in height and ½" in width. The slotted imperfection can be the self-contained rate sensitive component. If the impact velocity is low, self-contained rate sensitive component 414 may not be crushed and thus, battery-cell case structure 410 can be bent, providing a low reaction force. If the impact velocity is high, self-contained rate sensitive component 414 can be crushed and thus, battery-cell case structure 410 can be vertically crushed and collapse, providing a high reaction force.

FIGS. 4B-4D show results from finite element analysis (FEA) conducted using ABAQUS/explicit package from Dassault Systèmes of France. The tube 412 is fixed to a base 416. FIG. 4B shows the system before any impact force is applied. A friction coefficient of 0.3 can be used in the model. An impact mass 418 is set to be 10 kg. Different impact velocities were tested and were shown to result in different failure modes.

At an impact velocity of less than 10 m/s, for example, less than 5 m/s, the tube 412 undergoes unstable motions, as shown in FIG. 4C, which result in a very low reaction force of 0.5 kN. The greyscale representation shown in FIG. 4C depicts a magnitude of the stress experienced at different locations of the structure 410 under low impact velocity. Stronger reaction forces are concentrated near the imperfection 414 and on the lower half of the tube 412 that is connected to the base 416.

When the impact velocity increases to 25 m/s, the tube is fully crushed, providing a high reaction force of, for example, 6 kN as shown in FIG. 4D. In other words, the same structure 410 can provide reaction forces that differ by more than 1 order of magnitude using the imperfection 414, which serves as the self-contained rate sensitive component.

Figure 4E:
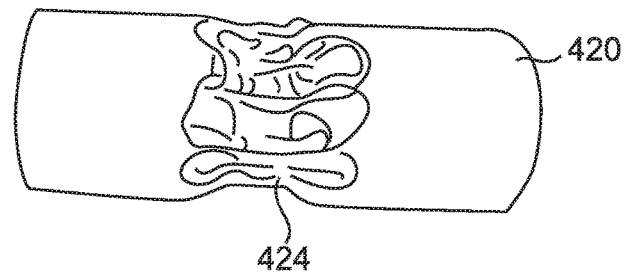
FIG. 4E shows a tube-shaped cell having a mid-span wrinkled wall.

FIG. 4E shows an aluminum film having a thickness of 0.0050" wound into a hollow tube structure 420. Two layers of electric tape were applied on top of the aluminum film, resembling the layers of deposited electrode materials. The structure 420 has an inner diameter (ID) of 18.40 mm, an outer diameter (ID) of 21.04 mm, and a height of 56.49 mm. The total mass of structure 420 is 5.14 g. A heat clamp was used to generate a wrinkled wall 424 in the middle of the structure 420.

Figure 4F:
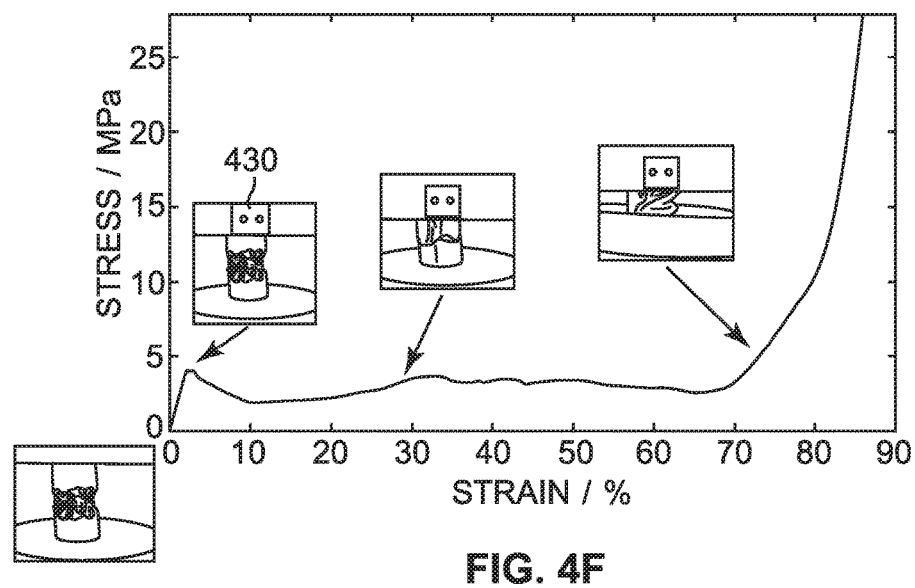
FIG. 4F shows a stress-strain curve of the cell of FIG. 4E.

A quasi-static compression test was conducted using an Instron 5582 system having a cross-head 430 (shown in FIG. 4F) at a compression velocity of 5 mm/min. Once the displacement of the cross-head reached 50 mm (i.e., after 10 minutes of movement of the cross-head), the structure 420 was removed from the system. FIG. 4F shows the stress-strain curve of the structure 420. Upon compression, the structure 420 had a stress plateau ~3 MPa with a deformability ~70%, and the absorbed energy was ~2 J/g. Compressibility is defined as a width of the compression plateau; absorbed energy is calculated by integrating the reaction force over the compression displacement, in the range of the compression plateau. The working pressure, i.e. the height of the compression plateau, of the structure 420 can be controlled by adjusting the height, the wall thickness, the diameter, the layered structure, and the wrinkle pattern of the wrinkle wall 412 in the structure 420.

Figure 4G:
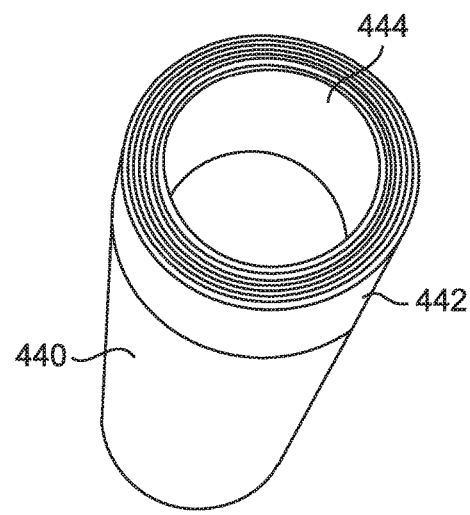
FIG. 4G shows a cylindrical cell.

In contrast to structure 420, FIG. 4G shows a hollow tube 440 formed by winding an aluminum film 442 having a thickness of 0.0050". Two layers of electric tape were similarly applied on top of the aluminum film 442 to resemble layers of deposited electrode materials. The tube 440 has an ID of 13.22 mm, an OD of 18.69 mm, and a height of 76.83 mm. The total mass of the specimen is 15.61 g. Tube 440 serves as an analogue of a tube-shaped battery cell having a vacant space 444 in a central section.

Figure 4H:
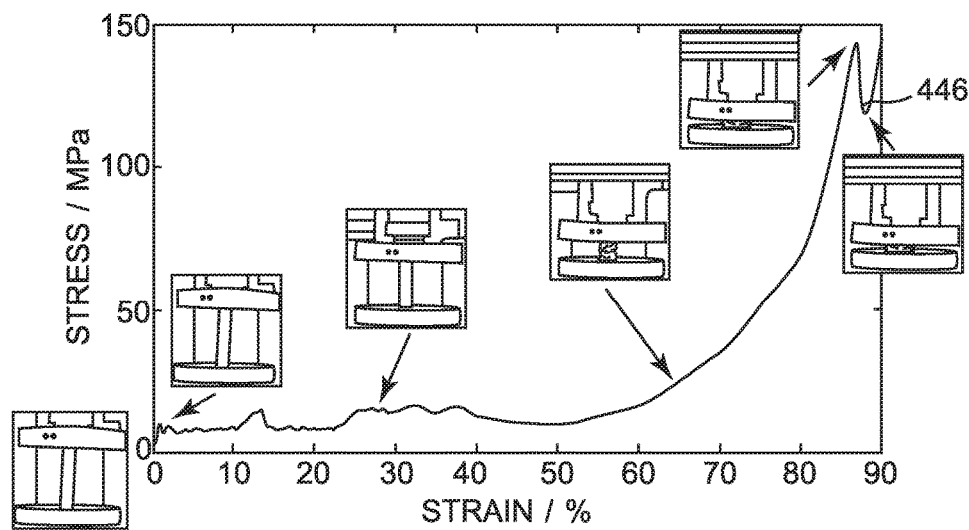
FIG. 4H shows a stress-strain curve of the cell of FIG. 4G.

A quasi-static compression test was conducted on the tube 440 using an Instron 5582 system with the cross-head speed of 5 mm/min. Once the displacement of the cross-head reached 70 mm, that is, after 14 minutes of displacing the cross-head 430, the tube 440 was removed from the system. FIG. 4H shows the stress-strain curve of the sample. Under compression, this tube-shaped cell had a stress plateau ~10 MPa with a deformability ~70%. Deformability is defined as the width of the stress plateau. The absorbed energy was around 5 J/g. The working pressure of the tube 440 can be controlled via adjusting the height, the wall thickness, the layered structure, and the diameter, and the material of the tube. Any behavior beyond the stress plateau, e.g. the dip in stress 446, does not affect the energy absorption performance.

Figure 4I:
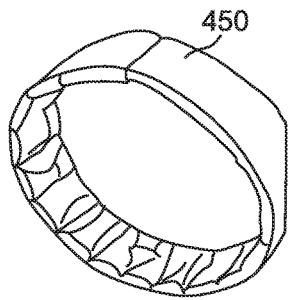
FIG. 4I shows a "donut"-shaped cell.
Figure 4J:
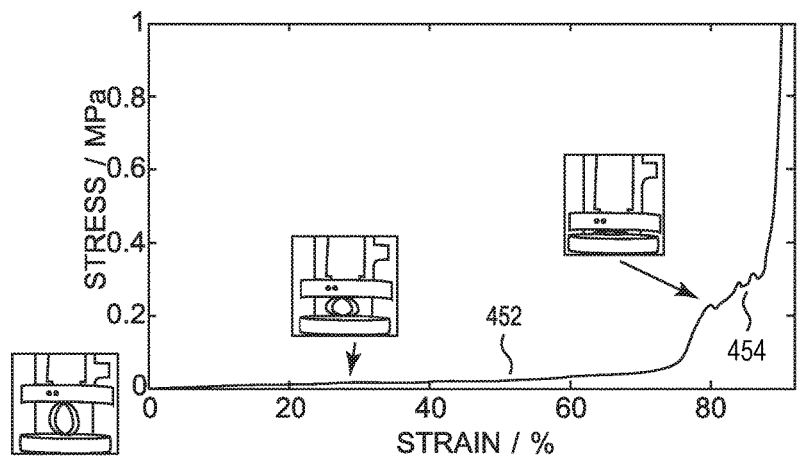
FIG. 4J shows a stress-strain curve of the cell of FIG. 4I.

FIG. 4I shows a donut-shaped ring structure 450 formed by joining the ends of a tube structure that is first formed by winding an aluminum film having a thickness of 0.0050". Two layers of electric tape were applied on top of the aluminum film to resemble the layers of deposited electrode materials. The ring has an ID of 47.66 mm, an OD of 53.40 mm, and a mass of 5.09 g. A quasi-static compression test was conducted using an Instron 5582 system with the cross-head speed of 5 mm/min. Once the displacement of the cross-head reached 50 mm, the donut-shaped ring structure 450 was removed from the system. FIG. 4J shows the stress-strain curve of the donut-shaped ring structure 450. Under compression, the donut-shaped ring structure 450 has a lower stress plateau 452 of ~0.02 MPa with a 75% deformability, and another higher stress plateau 454 of ~0.2 MPa with an additional ~10% deformability. The total absorbed energy was ~0.5 J/g. The working pressure of the ring structure can be controlled by adjusting the geometry, the layered structure, and the material of the donut-shaped ring structure.

Figure 4K:
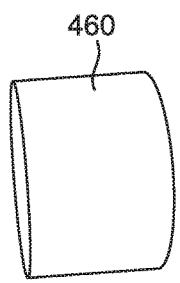
FIG. 4K shows a ring shaped cell.
Figure 4L:
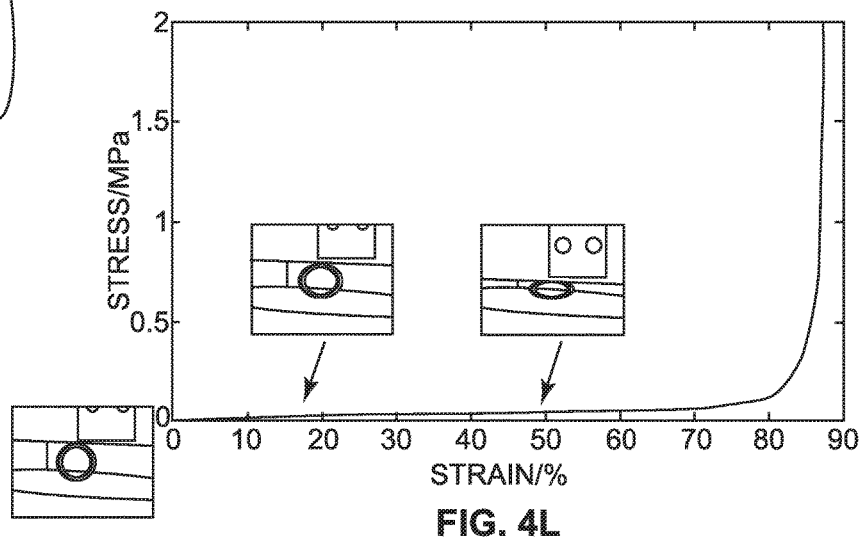
FIG. 4L shows a stress-strain curve of the cell of FIG. 4K.

FIG. 4K shows a ring structure 460 formed by winding an aluminum film having a thickness of 0.0050" into a tube structure. Two layers of electric tape were applied on top of the aluminum film to resemble layers of deposited electrode materials. The ring 460 has an ID of 12.99 mm, an OD of 15.27 mm, and a width of 10.62 mm. The total mass of the ring 460 is 0.84 g. A quasi-static compression test was conducted using an Instron 5582 system with the cross-head speed of 5 mm/min. Once the displacement of the cross-head reached 14 mm, the ring 460 was removed from system. FIG. 4L shows the stress-strain curve of the ring 460. Under compression, the ring 460 has a stress plateau ~0.03 MPa with a 80% deformability, and the total absorbed energy was ~0.1 J/g. The working pressure of the cell can be controlled via adjusting the geometry, the layered structure, and the material of the ring structure.

The deformability of a cell structure and a suitable range of working pressures enable the battery cell structure to be both a load carrying and energy absorbing component in a vehicle. The working pressure is defined by the requirements of the vehicle for load carrying or energy absorption, i.e. the pressure at which the battery cells or cell structures carry load or undergo energy absorbing deformation. To achieve this goal, battery cells can be designed as vacant or have a non-straight configuration. Alternatively, battery cells can be used to construct cell assemblies having vacant or non-straight configurations. In order to adjust the working pressure and the deformability of battery cells or battery-cell structures, the external and/or inner walls or structural components of battery cells or battery-cell structures can be curved to some curvature with certain wave length, along the expected loading direction. Or, a certain shaped vacant space, for example, in a tube, can be designed in a cell configuration or cell-structure configuration, so that the cell wall or cell-structure member can buckle or yield upon a sufficiently large external loading.

FIG. 5A shows a sigmoidal-shaped battery cell 510. The cell 510 is designed to absorb impact energy and to decrease deceleration in a collision. Cells are designed to provide a reaction force plateau and a relatively large compressibility, e.g. larger than 50% or larger than 75%. Computer simulations were conducted to analyze its internal damages in an impact test. Finite element analysis (FEA) software ABAQUS with explicit package from Dassault Systèmes of France was employed. Gurson's model for porous materials was adopted for the electrodes and the separator membrane. Gurson's model describes a compression stress-strain relation of a porous material. The Young's moduli of copper and aluminum charge collectors were set to be 110 GPa and 78.9 GPa, respectively. The moduli of anode, cathode and separator were set to 4.7 GPa, 5.1 GPa and 0.5 GPa, respectively. The model uses two layers of electrode materials, a 0.1 mm thick anode and a 0.2 mm thick cathode attached to a 0.01 mm thick aluminum and copper foils, respectively. Membrane separator with a thickness of 0.01 mm was placed between the anode and the cathode. An aluminum case with a wall thickness of 0.2 mm was used to house the battery system. The battery cell was modeled to have a thickness of 2 mm and a height of 20 mm. Periodic boundary conditions were used in the modeling. Two rigid walls were applied at both sides of the cell, representing the influence from other battery cells in the same module. The overall mesh size was set to 0.01 mm. The simulation results indicate that as the sigmoidal-shaped cell 510 is crashed, a relatively constant reaction force can be provided, and the compressibility is larger than 50%. The reaction force can be adjusted by controlling a wave length 512 and a magnitude 514 of the sigmoidal pattern. Compared with cells having straight walls, the tensile and shear stresses at the separation membranes are reduced, suggesting that the risk of internal shorting is lowered as a result of the lowered tensile and shear stresses.

FIG. 5B shows another battery cell 520 having an undulating profile of a wavelength 522 and a magnitude 524.

FIG. 5C shows a battery cell 570 having an asymmetric profile. Along the compression loading direction, on one side of the cell there is a curved pattern 571 with a wave length 572 and a magnitude 574; on the other side of the cell there is another set of curved pattern 573, with a different wave length 576 and a different magnitude 578.

FIG. 5D shows a prismatic battery cell 530 having wavy walls 532. The walls are curved along the compression loading direction. The curvature of the wavy wall can be adjusted to control a working pressure and other deformation characteristics of the battery cell 530.

FIG. 5E shows a schematic of a prismatic battery cell 540 with wavy walls. The wavy pattern is two dimensional, along two orthogonal compression loading directions. The curvature of the wavy walls can be adjusted independently to control the working pressure and the deformation procedure of the battery cell.

Figure 5F:
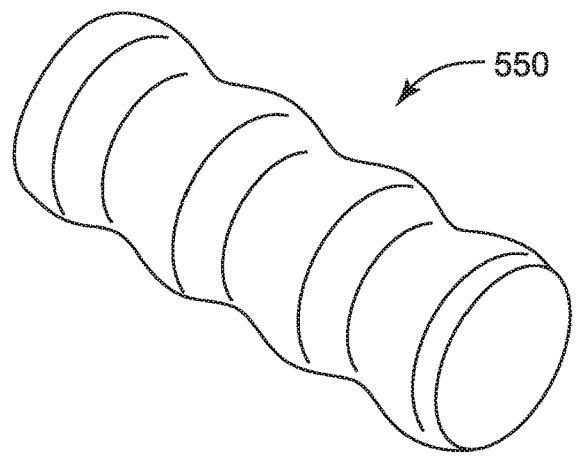
FIG. 5F shows a cylindrical battery cell using a wavy wall.

FIG. 5F shows the computer simulation model of a cylindrical cell 550 with a wavy wall along the compression loading direction. The curvature of the wavy walls can be adjusted to control the working pressure and the deformation procedure of the battery cell.

In generally, a symmetric or asymmetric curved-wall battery cell can be used to fit the shape of other structural components of an EV, such as the hood, the bumper, the columns and beams to fully utilized the inner space of the EV and to improve the safety and the load-carrying capacity of battery.

Figure 5G:
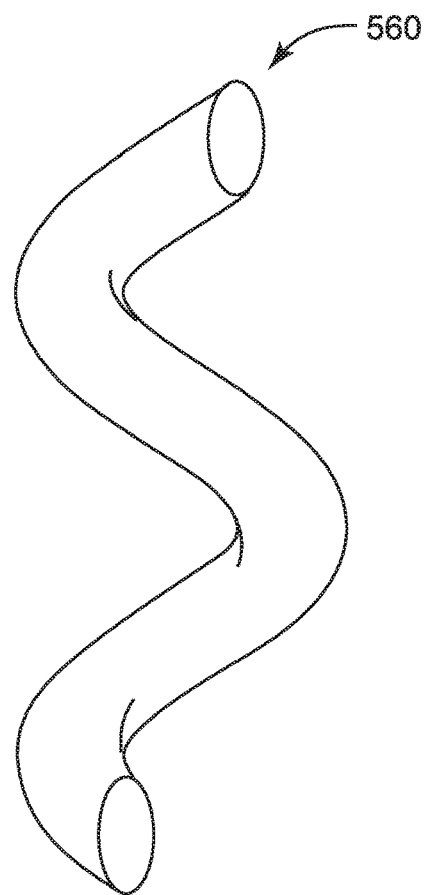
FIG. 5G shows a spring-shaped battery cell.

FIG. 5G shows a spring-shaped battery cell 560, curved along the compression loading direction. The curvature as well as the diameter of the battery cell 560 can be adjusted to control the working pressure and the deformation procedure of the battery cell. In addition, the battery cell 560 can be hollow.

FIG. 6A shows a battery cell release system 600. Cell structures 602 are placed in a module case 604. In the following test, only the bottom portion of the module case is included in the system, so as to observe the cell behaviors. The module case 604 is made of a U-shaped aluminum channel with an inner dimension of ⅝" by ⅝", a height of 2" and a wall thickness of 1/16". A door 606 is connected to the U-shaped channel as an outlet for deformed battery structure to slide aside under impact, as shown in FIG. 6B. When the battery cell structure is compressed vertically, it can deform horizontally at the same time. The cell structure is made by eight aluminum cells 602 connected by hinges. The dimension of cell is 1" by 1" by 3/16". The height of the overall cell structure is 4" and the cross-section is 1" by 1".

FIG. 6C is another side view of the cell release system 600 from the side away from the door 606.

FIG. 7A shows a battery cell release system 700. A cell structure 702 is placed in a module case 704. The module case 704 is made of a rectangular shaped aluminum tube with inner dimensions of ¾" by ⅝", a height of 1.7" and a wall thickness of ⅛". The cell structure 702 is made by three aluminum cells connected by hinges. The dimension of cell is 1" by 1" by 3/16". The self-releasing system 700 is made of two aluminum sheets 706 (shown in FIG. 7A), connected to a wall of the module case 704 by adhesives. The sloped aluminum sheet 706, serving as a guiding path, is initially curved to a curvature around ¼ in$^{-1}$. The cell structure 702 is initially held by aluminum foils 707 attached to module wall. FIG. 7A shows the battery structure before impact.

A quasi-static compression test was conducted using an Instron 5582 system with a cross-head speed of 20 mm/min. The cross head of the Instron 5882 was removed from the system 700 once the cell structure is fully released, as shown in FIG. 7C. Test results show that cell structure can be released from the module case 704 with the help of the self-releasing system 706. Furthermore, from the test results, it can be observed that the self-releasing system 700 has the capability of guiding the cells into a battery cell collection system (not shown), which can advantageously provide better cell protection and can enhance occupant safety.

Figure 8A:
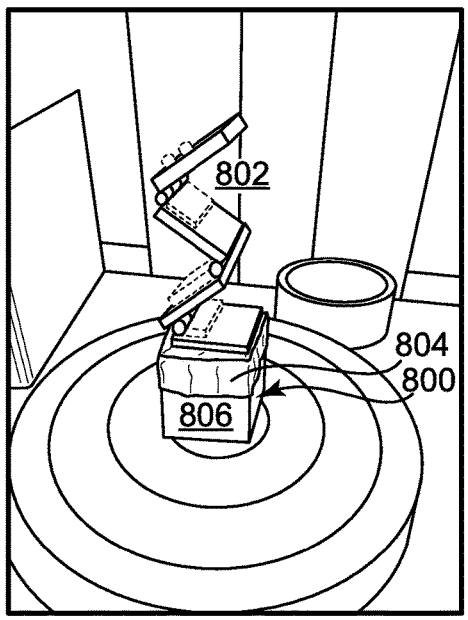
FIG. 8A shows a battery collection system before impact.

FIG. 8A shows a cell structure 802 placed on top of a battery cell release system 800. The cell release system 800 is made of a rectangular aluminum tube 806 with an inner dimension of ⅝" by ⅝", a height of ½" and a wall thickness of 1/16". Aluminum foils 804 are placed on top of the tube, serving as a base for the cell structure 802. The cell structure 802 is s-shaped and is made by four aluminum cells connected by hinges. The dimension of the cell is 1" by 1" by 3/16".

Figure 8B:
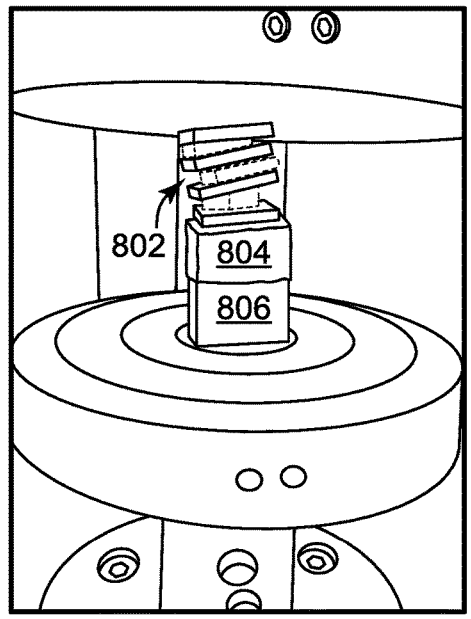
FIG. 8B shows the battery collection system of FIG. 8A during impact.
Figure 8C:
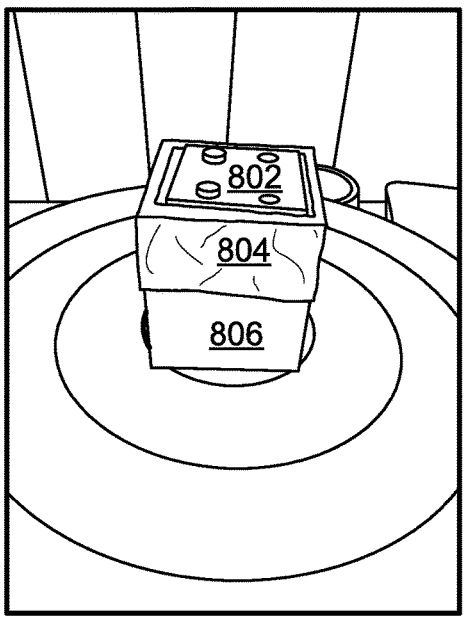
FIG. 8C shows the battery collection system of FIG. 8A after impact.

A quasi-static compression test was conducted using an Instron 5582 system with a cross-head speed of 20 mm/min. The load was removed from the specimen once the cell structure is fully collected by the cell-releasing system. The cell structure 802 first deforms under compression. After the cell structure is fully deformed, the weak base, which is formed of aluminum foils 804 in this case, is broken. The deformed cell structure 802 is thus collected by the cell releasing system 800, as shown in FIGS. 8B and 8C.

Test results show that the cell release system is able to collect cells or cell structures (for example, the cell structure 802) in an orderly way after the cell structure is fully deformed. This feature can protect battery cells 802 from damage in an impact event.

A quasi-static compression test was conducted using an Instron 5582 system with the cross-head speed of 20 mm/min. Once the cell structure is fully crushed, the load was removed from the specimen. The final strain is 60%. Test results show that, with the existence of cell releasing mechanism, battery cells are well protected under even very large deformation.

Figure 8D:
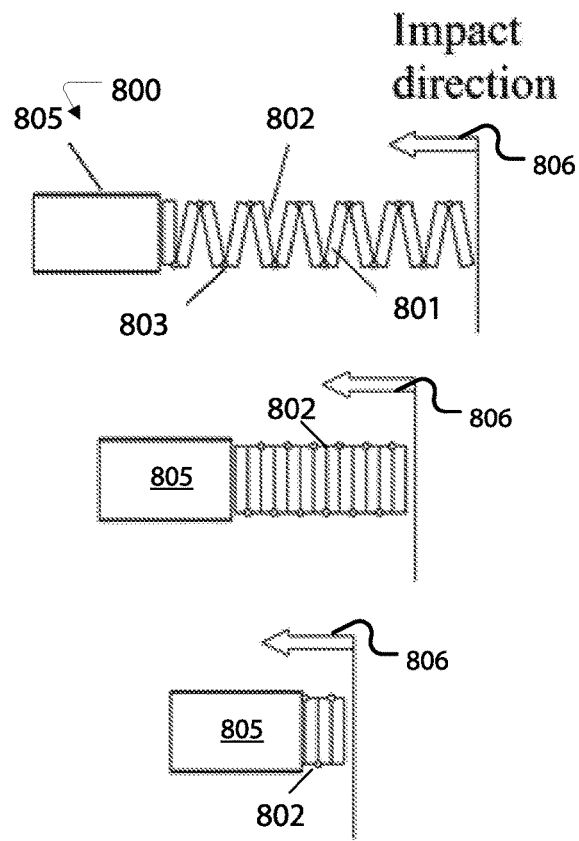
FIG. 8D shows schematic diagrams of the battery collection system.

FIG. 8D shows a schematic of the battery cell release system 800. Battery cell structure 802 is formed using cells 801 and mechanical connections 803 (e.g., hinges). In an impact scenario, the Z-shaped battery cell structure 802 is first deformed into a compact configuration when impacted by a force along the direction indicated by arrow 806, as shown in the middle panel of FIG. 8D before and then it is released to a safe box 805 as shown in the last panel of FIG. 8D, which is part of the cell collection system 800.

Figure 9A:
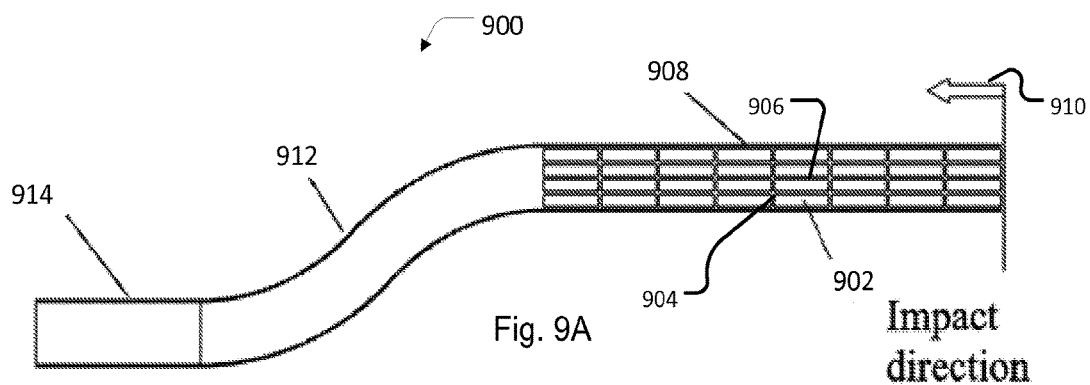
FIG. 9A shows a battery cell release system before impact.
Figure 9B:
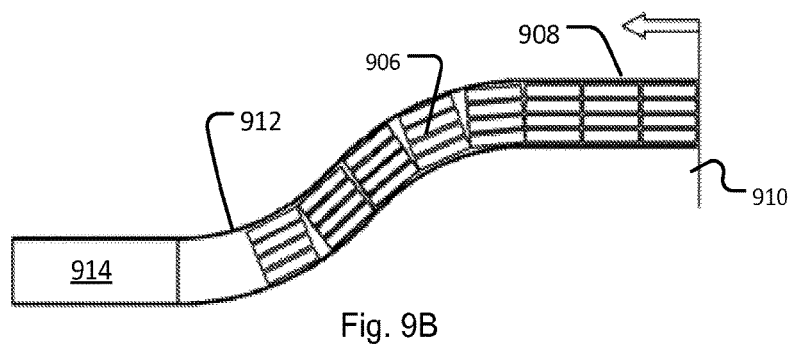
FIG. 9B shows the battery cell release system of FIG. 9A during impact.
Figure 9C:
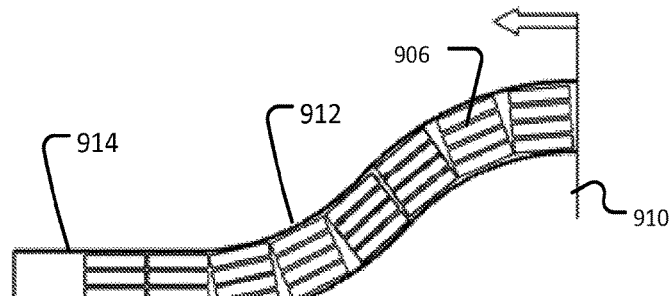
FIG. 9C shows the battery cell release system of FIG. 9A during impact.

FIG. 9A shows a battery cell self-releasing system 900. Battery cells 902 connected by connections 904 (e.g., hinges) into a battery cell structure 906 are placed in a module 908. When an impact force (along the direction indicated by arrow 910) is applied, the battery cell structure 906 slides out of walls of the module 908 into a curved channel 912, which is part of the self-releasing system 900, through which cells are finally release into a cell collection system 914. FIG. 9B shows the battery cell structure 906 sliding along the curved channel 912. FIG. 9C shows the battery cell structure 906 reaching the cell collection system 914 upon an application of impact force along the direction indicated by arrow 910. Connections 904 between cells will be broken when the cells bypass curved channel 912.

Figure 10A:
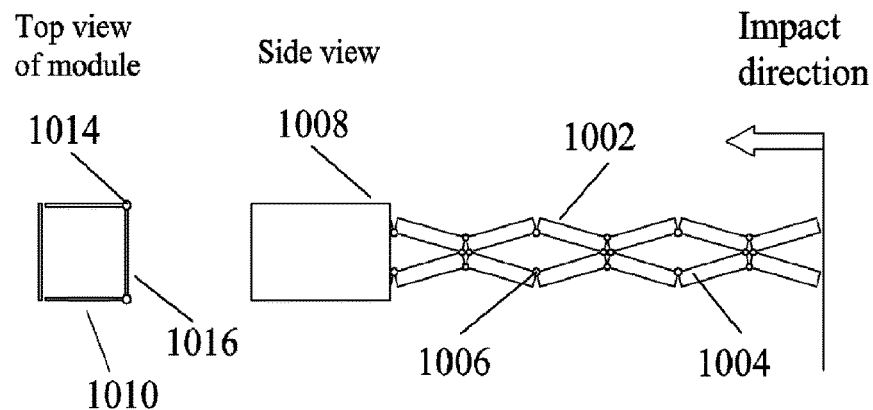
FIG. 10A shows a battery collection system before impact.
Figure 10B:
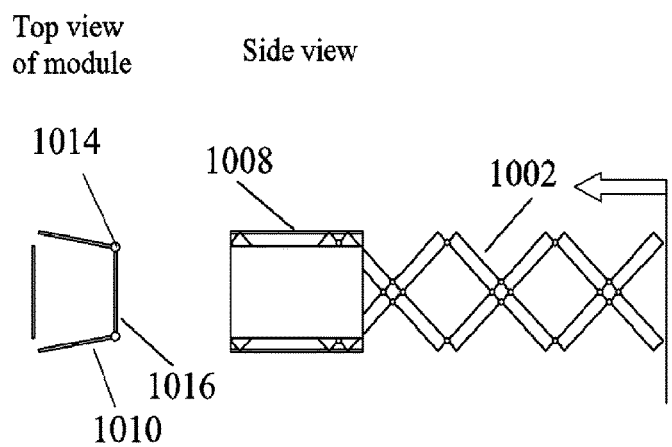
FIG. 10B shows the battery collection system of FIG. 10A while the battery structure is being collapsed.
Figure 10C:
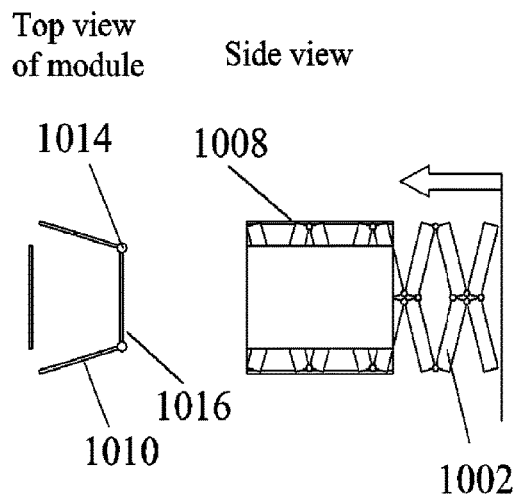
FIG. 10C shows the battery collection system of FIG. 10A while the battery structure is being collapsed.

FIG. 10A shows a X-shaped battery cell structure 1002 that includes cells 1004 and connection 1006 (e.g., hinges). In an impact scenario, X-shaped battery cell structure 1002 deforms; a module 1008 having walls 1016 provides an opening door 1010 connected with wall 1016 via hinge 1014 and allows cell structure 1002 to further deform without damaging cells 1004. When the cell structure 1002 deforms vertically, it can have a lateral expansion due to the rotation of cells 1004, during which cells 1004 will contact doors 1010. With the vertical deformation of cell structure 1002, the lateral expansion can open doors 1010. The cell structure 1002 deforms into a compact configuration without damaging any cells, and is collected in the module 1008 as shown in FIGS. 10B and 10C.

Figure 11A:
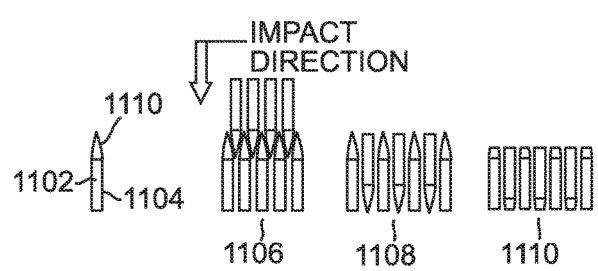
FIG. 11A shows a battery structure.

FIG. 11A shows a battery cell 1102 that is placed into a bullet cross-sectioned cell case 1104. Battery cells 1102 are arranged in two opposing rows 1106 with the bullet cross-sectioned cell cases 1104 facing one another. In an impact scenario, battery cells 1102 will slide against each other to form an interleaved layer 1108 in which the bullet cross-sectioned cell cases 1104 are arranged to alternately face an opposite direction. The bullet cross-sectioned cell cases 1104 can further deform by crushing head part 1110 of cell case 1104, allowing the crush of battery cells 1102 to be avoided.

Figure 11B:
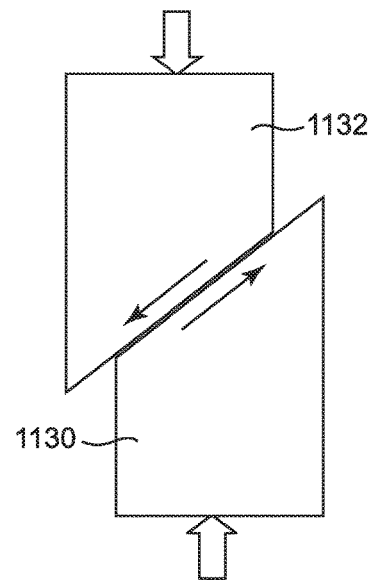
FIG. 11B shows two sliding battery components.

FIG. 11B shows shear sliding between structural members 1130 and 1132 which can further operate using friction; sliding; locking (e.g., when two surfaces have features that block the relative motion of each other); or stiction (e.g., when bonding between two surfaces is strengthened by adhesives). For example, internal locking may be realized by using locking gears, teeth, grooves, pins, holders, and/or hooks, in between the structural components 1130 and 1132 that undergo relative motions. The direction, force, area, and displacement of FSLS can be controlled by compression/holding pressure, contact area, structural configuration, surface features (e.g. roughness), etc.

Figure 11C:
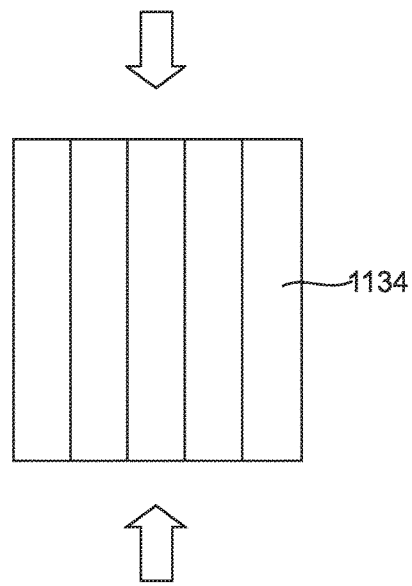
FIG. 11C shows an array of battery components.

FIG. 11C shows compression of an array/truss of rods, plates, columns, and/or pillars which leads to internal FSLS among the structural components 1134, as they deform (e.g. buckle) along different directions and have relative motions with respect to each other.

Figure 11D:
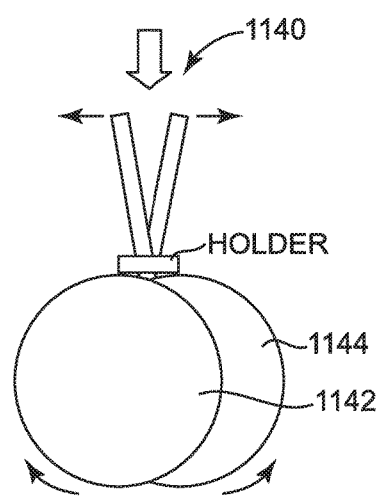
FIG. 11D shows a battery structure.

FIG. 11D shows compression of a structure 1140 that causes an angular relative motion between the structural components 1142 and 1144, which in turn leads to internal FSLS. The normal pressure among the moving parts that have relative motions can be adjusted; the surface properties of the interfaces can be adjusted.

Figure 12A:
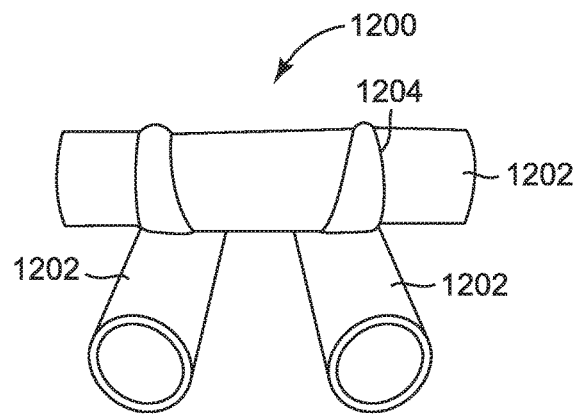
FIG. 12A shows a battery truss.

FIG. 12A shows an arrangement 1200. In general, any curved or straight battery cells can be combined to build up a 2D or 3D truss or array to form a structure having non-straight components. For example, a truss can contain non-straight components formed by a number of members—each member can be either straight or non-straight. An aluminum film with the thickness of 0.0050" was wound into a tube 1202. Two layers of electric tape were applied on the surface of the aluminum film to resemble electrode materials in an actual battery. Each tube 1202 has an ID of 12.96 mm, and OD of 14.80, and a height of 65.28 mm. Each tube 1202 is an analogue of a cylindrical battery cell.

Three tube cells 1202 can be connected using connection component 1204 to form a non-straight structural component in the form of the arrangement 1200. The mass of the arrangement is 14.61 g.

Figure 12B:
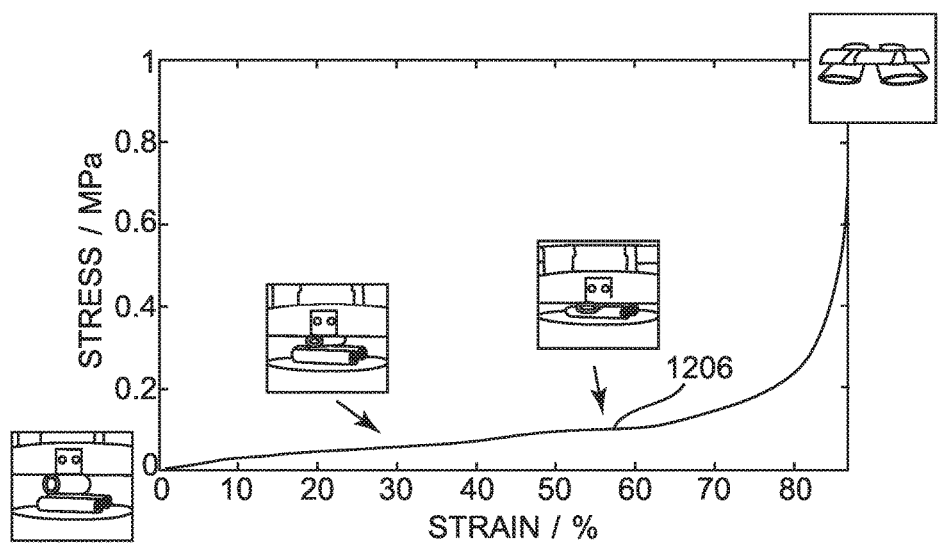
FIG. 12B shows a stress-strain curve of the battery truss of FIG. 12A.

A quasi-static compression test was conducted using an Instron 5582 system with a cross-head speed of 5 mm/min. Once the displacement of the cross-head reached 27 mm the cross-head was removed from the arrangement 1200. FIG. 12B shows the stress-strain curve. Under compression, the arrangement 1200 had a stress plateau 1206 of ~0.1 MPa with a deformability ~80%. The absorbed energy was around 0.2 J/g. The working pressure can be controlled via adjusting the height, the wall thickness, the layered structure, the angle between the tubes 1202, the diameter, the structural configuration, and the material of the tube 1202. In addition, the pattern of the truss, such as the number of tubes, the orientation and location of the tubes, and the manner in which the tubes are joined (e.g., by pivoting, adhesion, welding, screw connection, bolt connection, etc.) can be adjusted to optimize the energy absorption efficiency and load carrying characteristics of the arrangement.

Figure 13A:
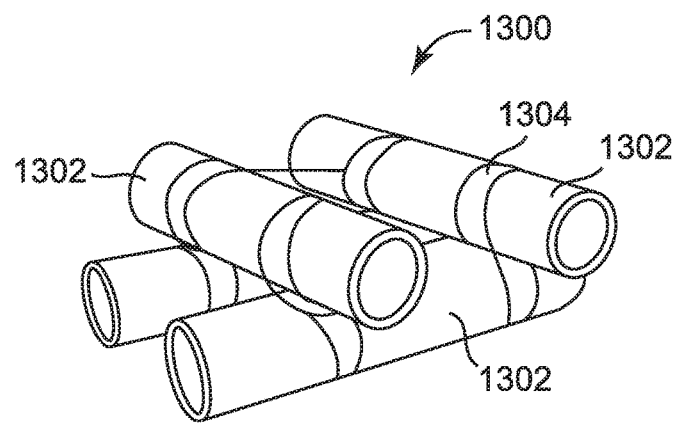
FIG. 13A shows a battery truss.

FIG. 13A shows an arrangement 1300. An aluminum film with a thickness of 0.0050" was wound into a tube structure 1302. Two layers of electric tape were applied on the aluminum film to resemble electrode materials in an actual battery. Each tube 1302 has an ID of 9.10 mm, an OD of 12.09 mm, and a height of 66.31 mm. Each tube 1302 is an analogue of a cylindrical battery cell. Four tubes 1302 were used to construct the non-straight structural component of arrangement 1300. The mass of the arrangement is 19.78 g. Connection component 1304 can be made of cotton threads with a diameter of 0.3 mm.

Figure 13B:
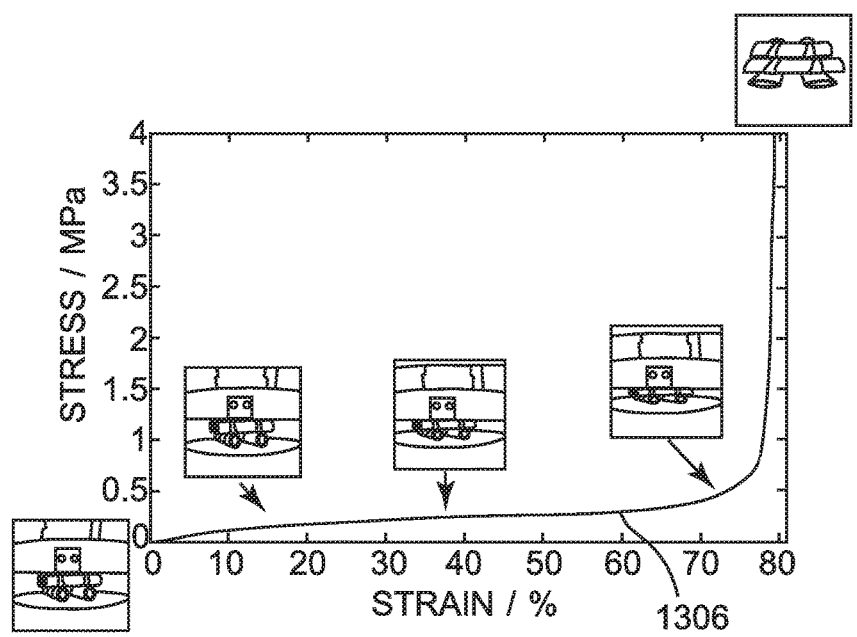
FIG. 13B shows a stress-strain curve of the battery truss of FIG. 13A.

A quasi-static compression test was conducted using an Instron 5582 system with a cross-head speed of 5 mm/min. Once the displacement of the cross-head reached 20 mm the cross-head was removed from the arrangement. FIG. 13B shows the stress-strain curve. Under compression, this structural component had a stress plateau 1306 of ~0.25 MPa with a deformability ~75%. The absorbed energy was around 0.2 J/g. The working pressure can be controlled via adjusting the height, the wall thickness, the layered structure, the angle of the tubes, the diameter, the structural configuration, and the material of the tubes. In addition, the pattern of the truss, such as the number of structural components, the orientation and location of the components, and the joining methods, can be adjusted to optimize the energy absorption efficiency and other load carrying characteristics.

Figure 14A:
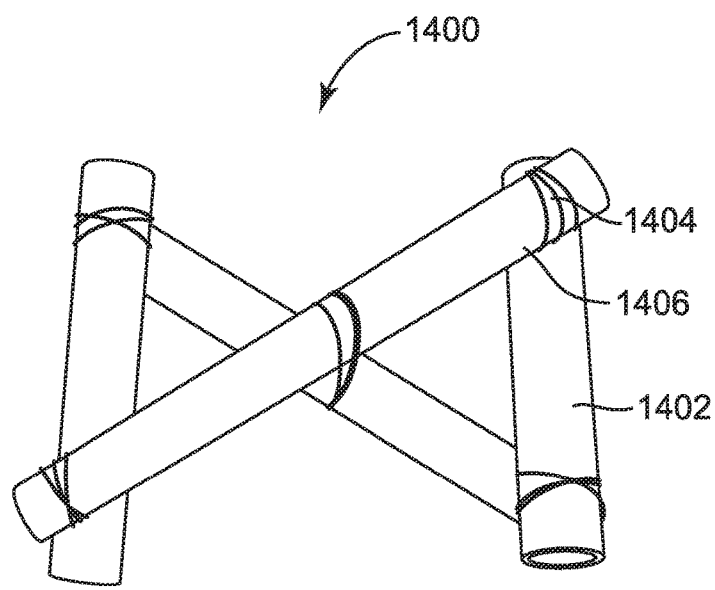
FIG. 14A shows a battery truss.

An aluminum film with a 0.0050" thickness was wound into tube structures 1402 and 1406 as shown in FIG. 14A. Two layers of electric tape were applied on the aluminum film to resemble deposited electrode materials in an actual battery cell. Each tube structure 1402 (arranged vertically) has an ID of 9.10 mm, an OD of 12.09 mm, and a height of 64.25 mm. Each tube structure 1404 (arranged diagonally) has an ID of 9.10 mm, and OD of 10.40 mm and a height of 96.86 mm. Two tube structures 1402 and two tube structures 1404 are used to construct a non-straight structural component 1400 depicted in FIG. 14A. The total mass of the structural component 1400 is 14.39 g.

Figure 14B:
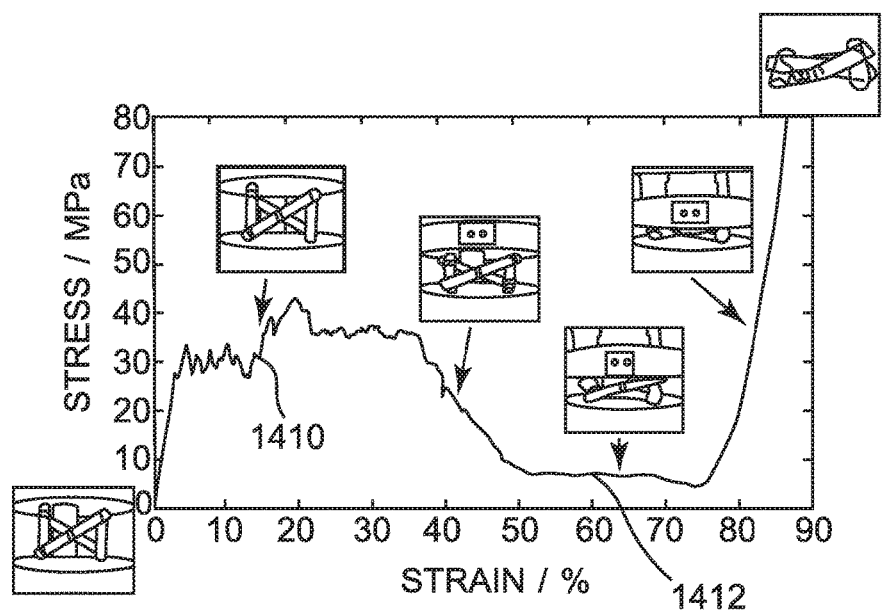
FIG. 14B shows a stress-strain curve of the battery truss of FIG. 14A.

A quasi-static compression test was conducted using an Instron 5582 system with a cross-head speed of 5 mm/min. Once the displacement of the cross-head reached 60 mm the cross-head was removed from the structural component. FIG. 14B shows the stress-strain curve of the structural component. Under compression, the structural component 1400 has two stress plateaus 1410 and 1412 of ~35 MPa and ~7 MPa, respectively, with a total deformability ~75%. The absorbed energy was around 4 J/g. The working pressure can be controlled via adjusting the height, the wall thickness, the layered structure, the angle, the diameter, the structural configuration, and the material of the cell. In addition, the pattern of the truss, such as the number of structural components, the orientation and location of the components, and the joining methods, can be adjusted to optimize the energy absorption efficiency and the load carrying characteristics.

Figure 15A:
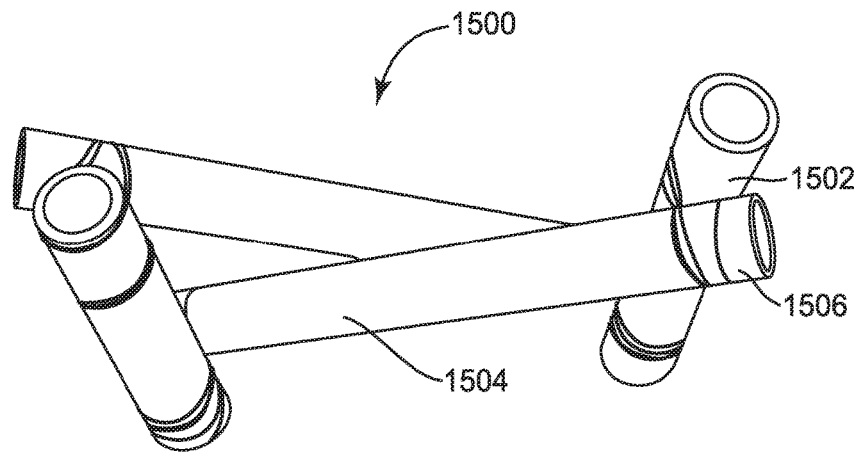
FIG. 15A shows a battery truss.

FIG. 15A shows an arrangement 1500. An aluminum film with a thickness of 0.0050" was wound into a tube structure 1502. Two layers of electric tape were applied on the aluminum film surface to resemble deposited electrode materials in an actual battery cell. Two tubes 1502 and two tubes 1504 are used to produce the arrangement 1500 which is in the form of a model truss component. Each vertical tube 1502 has an ID of 9.20 mm, and OD of 11.81 mm, and a height of 64.49 mm. Each tube is an analogue of a cylindrical battery cell. Each diagonal tube 1506 has an ID of 9.20 mm, an OD of 10.22 mm, and a height of 107.36 mm.

In the arrangement 1500, Loctite 409 Super Bonder from Henkel of Rocky Hill, Conn. was used at the joints between the tubes to promote internal stiction. The total mass of the arrangement 1500 is 14.94 g.

Figure 15B:
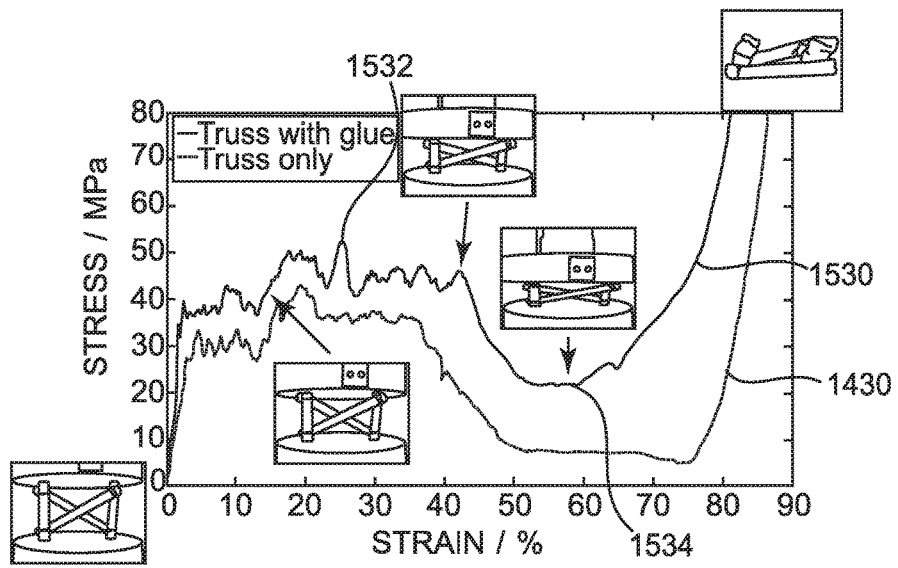
FIG. 15B shows a stress-strain curve of the battery truss of FIG. 15A.

A quasi-static compression test was conducted using an Instron 5582 system with a cross-head speed of 5 mm/min. Once the displacement of the cross-head reached 60 mm the cross-head was removed from the arrangement. FIG. 15B shows the stress-strain curves 1530 and 1430 of the arrangement 1500 and the structural component 1400, respectively. The curve 1430 is used for reference.

Under compression, the arrangement 1500 unit had two stress plateaus 1532 and 1534 of ~40 MPa and ~25 MPa respectively, and a total deformability ~70%. The absorbed energy was around 5.35 J/g. The working pressure is higher than that of the structural component 1400. The working pressure can be controlled via adjusting the height, the wall thickness, the layered structure, the angle, the diameter, the structural configuration, the material of the cell and the surface roughness of the structural components. In addition, the pattern of the truss, such as the number of structural components, the orientation and location of the components, and the joints/stiction components, can be adjusted to optimize the energy absorption efficiency and the load carrying characteristics.

Figure 16A:
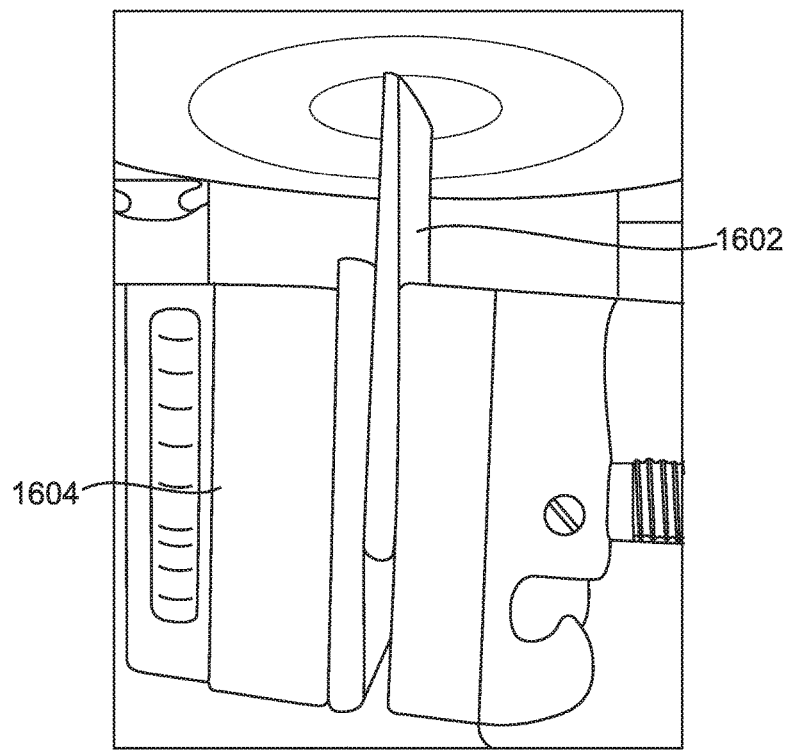
FIG. 16A shows a prismatic block structure.

An aluminum film with a 0.0050" thickness was wound into a prismatic block 1602 as shown in FIG. 16A. Two layers of electric tape were applied on the aluminum film surfaces to resemble deposited electrode materials in an actual battery cell. The block 1602 has a thickness of 5.22 mm, width of 35.36 mm, and a height of 61.82 mm. Each block 1602 is an analogue of a prismatic battery cell. Two prismatic cells were clamped by a vise 1604 to various pressures. The vise provides a lateral compression force, and thus, the two prismatic cells are held together. The total mass of the prismatic block 1602 is 19.68 g.

Figure 16B:
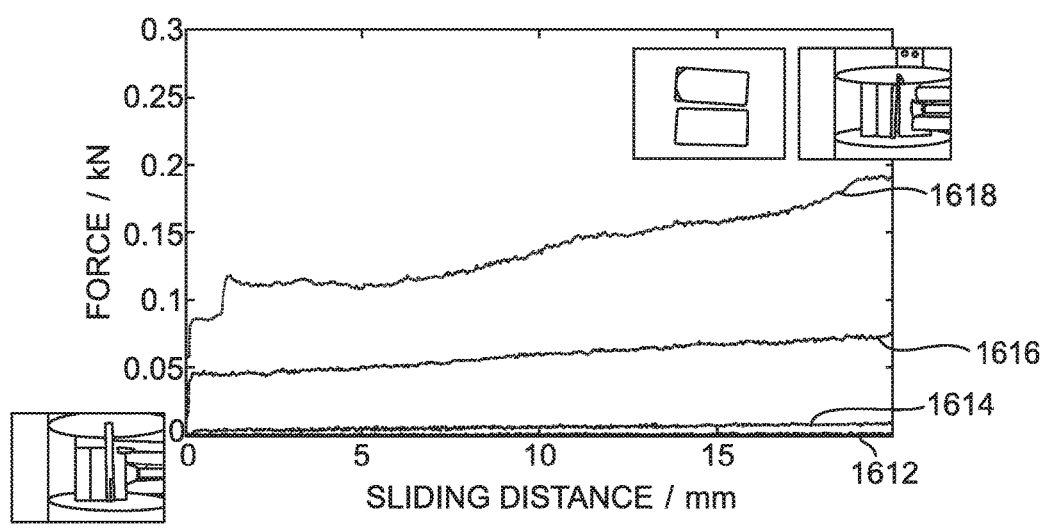
FIG. 16B shows a force vs. sliding distance plot of the block structure of FIG. 16A.

A quasi-static compression test was conducted using an Instron 5582 system with a cross-head speed of 5 mm/min. Once the displacement of the cross-head reached 20 mm the cross-head was removed from the prismatic block. FIG. 16B shows force vs. sliding distance plots 1612, 1614, 1616, and 1618 of the prismatic block. The pressure applied by the vise was increased from 1612 to 1618. Correspondingly, the energy dissipated by the sample was increased from nearly 0 J/g to 0.15 J/g. After the tests, the prismatic cells were not deformed. The pressure of plateau can be controlled via adjusting the size, the layered structure, the angle, the structural configuration, the holding pressure (e.g., the holding pressure of the vice), the material of the cell, the surface conditions (e.g. roughness) of the cell and the surface area of the cell.

Figure 17A:
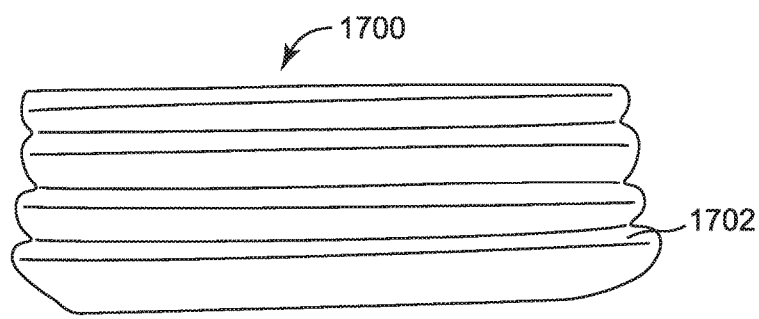
FIG. 17A shows a battery structure.

An aluminum film with a thickness of 0.0050" was wound into a prismatic block 1702, in FIG. 17A. Two layers of electric tape were applied on the aluminum film to resemble deposited electrode materials in an actual battery cell. Each prismatic block 1702 has a thickness of 5.30 mm, a width of 35.30 mm, and a height of 64.17 mm. Each block is an analogue of a prismatic battery cell. The total mass of a single block 1702 is 9.93 g.

A composite cell structure 1700 containing four prismatic cells 1702 was formed, by applying Loctite 409 Super Bonder from Henkel of Rocky Hill, Conn., as an adhesive layer in between adjacent blocks 1702, as shown in FIG. 17A. The structure 1700 has a thickness of 21.20 mm, a width of 35.31 mm, and a height of 65.62 mm. The total mass of the structure 1700 is 41.14 g.

Figure 17B:
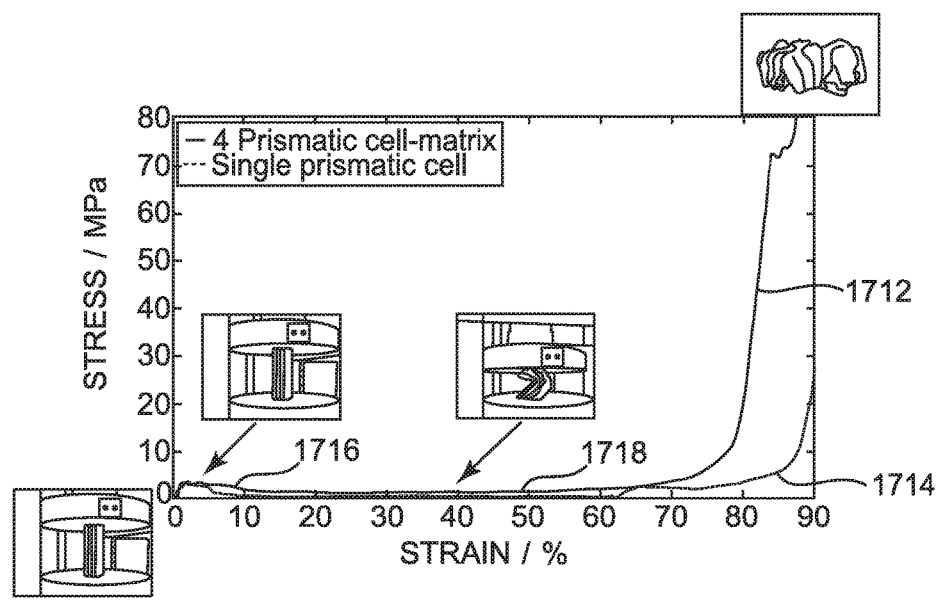
FIG. 17B shows a stress-strain curve of the battery structure of FIG. 17A.

A quasi-static compression test was conducted using an Instron 5582 system with a cross-head speed of 5 mm/min. Once the displacement of the cross-head reached 60 mm the cross-head was removed from the structure. FIG. 17B shows the stress-strain curves 1712 and 1714 of the structure 1700 and of a single prismatic cell 1702, respectively. Under compression, the structure 1700 has two stress plateaus 1716 and 1718, of ~1.35 MPa and ~85 MPa respectively, with a total deformability ~85%. The absorbed energy was around 3.88 J/g. While the single prismatic cell had only one plateau at ~0.39 Mpa with a total deformability of 80%. The absorbed energy was around 0.49 J/g. The working pressure can be controlled via adjusting the height, the width, the thickness, the layered structure, the angle, the structural configuration, the material of the cell, and the matrix materials (e.g., epoxy resin). In addition, the pattern of the cell structure, such as the number of structural components, the orientation and location of the components, and the bonding strength between cells, can be adjusted to optimize the energy absorption efficiency and the load carrying characteristics.

Figure 18A:
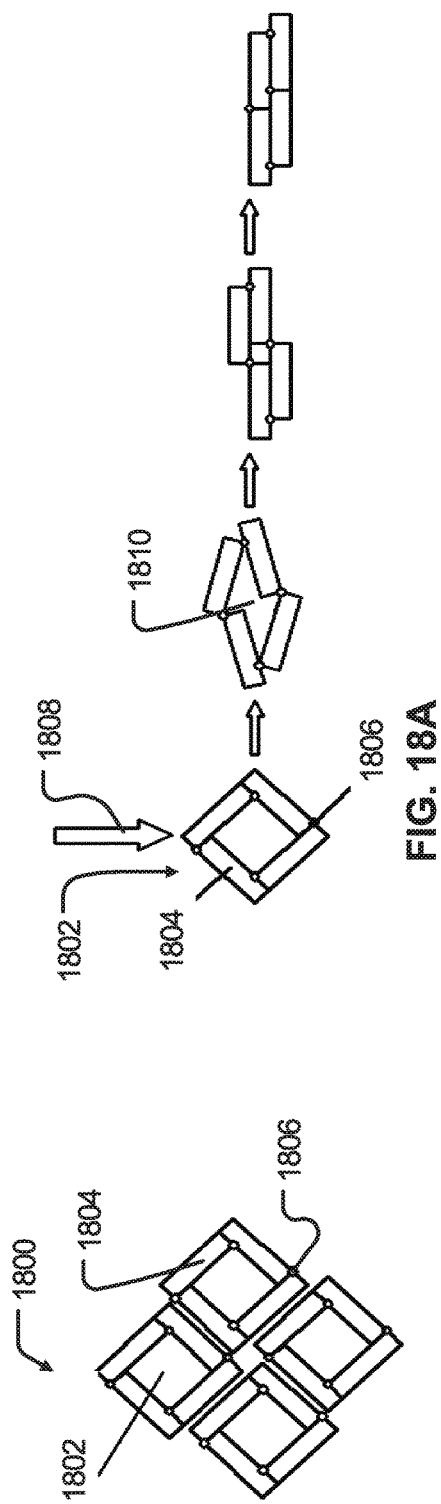
FIG. 18A shows a schematic of a self-folding cell structure.

FIG. 18A shows a self-folding or self-unfolding battery-cell module 1800 formed by four battery units 1802. Each battery unit 1802 includes four battery cells 1804, and the unit 1802 can open up or shrink, without damaging the battery cells 1804 upon mechanical loading. The folding or unfolding can be accompanied by deformation of other structural components near the battery unit 1802, e.g. battery cell module 1800 or pack walls, which provides reaction forces. The folding or unfolding of the battery-cell module 1800 serves as a protection mechanism for the battery cells 1804. The folding or unfolding can be achieved by deformation, displacement, and/or rotation of battery cells 1804 and/or structural components (e.g., the battery unit 1802) formed by battery cells. The folding/unfolding, can be controlled by the deformation, displacement, and/or rotation of battery cells 1804, connectors 1806, and fixtures of the battery system. When an impact force is applied along a direction 1808, the battery unit 1802 is compressed such that a hollow space between the battery cells 1804 decreases until adjacent battery cells 1804 come into contact along their parallel surfaces.

Figure 18B:
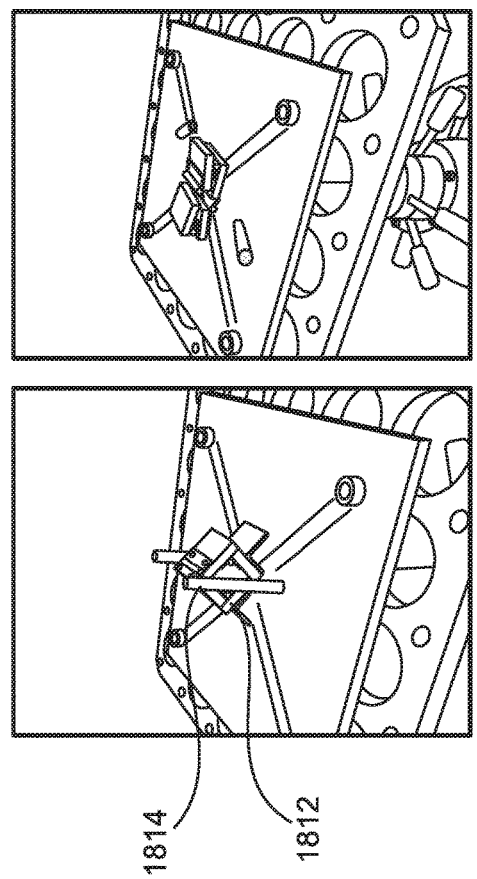
FIG. 18B shows a four-cell unit before (left) and after (right) an impact.

In one example, a self-folding four-cell unit 1812 is tested. Solid prismatic aluminum blocks, with the size of 1"×1"×0.25", are used as the model battery cells, as shown in FIG. 18B. Four mechanical hinges were bolted on the cells to form the unit 1812. Two 1/16" thick hollow V-shaped aluminum 6016H6 angles was placed at the bottom of the unit 1812 as a support. A model module case wall 1814 was constructed using stainless steel 304 tubes. The stainless steel tube was 3" in length, ¼" in diameter, with a tube wall thickness of 0.02". During the test, the model module case wall 1814 was placed next to the unit 1812. An impact test was conducted using an Instron Ceast 9350 drop tower with an impact velocity of 6 m/s. The self-folding four-cell unit 1812 successfully folds into a compact configuration and the model module case wall 1814 provided a reaction stress of 4 MPa.

Figures 19A, 19B:
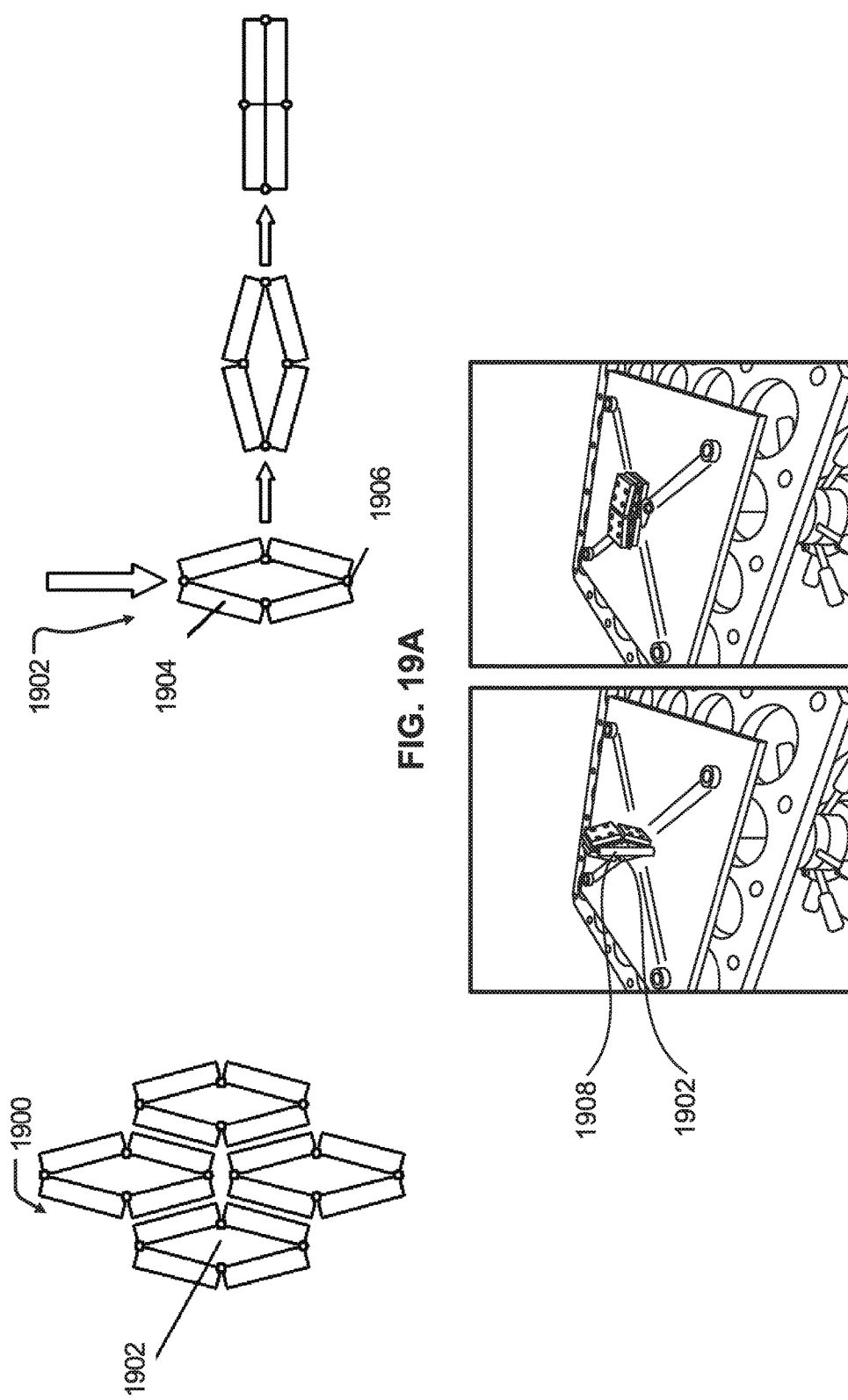
FIG. 19A shows a self-unfolding cell structure.
FIG. 19B shows a four-cell unit before (left) and after (right) an impact.

FIGS. 19A-B show a self-unfolding cell structure 1902. Solid prismatic aluminum blocks, with the size of 1"×1"×0.2", are used as model battery cells 1904. Four hinges 1906 were bolted on cells to form the structure. A model module case wall 1908 was made by stainless steel 304 tubes. The tube was 3" in length, ¼" in diameter, with the tube wall thickness of 0.02". During the test, the model module case wall 1908 was placed next to the unfolding cell unit 1902. An impact test was conduct using Instron Ceast 9350 drop tower with an impact velocity of 6 m/s. The self-unfolding structure 1902 successfully unfolds and the model module case wall 1908 provided a reaction stress of 4 MPa. Four cell structure 1902 can form a cell module 1900.

In another example, a self-unfolding structure 2002 is tested, as shown in FIGS. 20A and 20B. Eight solid prismatic aluminum blocks, with the size of 1"×1"×0.2", were used as model battery cells 2004. Four hinges 2006 were bolted on cells to form four cell columns. The model cells were vertically placed around an aluminum 6061H16 tube 2008. The cross section of the tube was ½" by 1", and the tube wall thickness was 1/16". The cells were attached to the tube by copper wires with the diameter of 0.02". An impact test was conducted using an Instron Ceast 9350 drop tower with the impact velocity of 10 m/s. The self-folding structure 2002 unfolds into a compact configuration and the aluminum tube 2008 in the middle provided a reaction stress of 4 MPa.

In another example, a self-folding structure 2102 is tested, as shown in FIGS. 21A and 21B. Solid prismatic aluminum blocks, with the size of 1"×1"×0.2", were used as model battery cells 2104. Four hinges 2106 were bolted on cells to form the structure. Aluminum 6061H6 angles with the dimension of 1"×1" and the wall thickness of 1/16" were employed as self-folding aiding triggers 2108. The angles were placed in between the cells at the top and the bottom of the cell structure. A model module case wall 2110 was mode of stainless steel 304 tubes. The stainless steel tube was 3" in length, ¼" in diameter, with the tube wall thickness of 0.02". During the test, the model module case wall 2110 was placed next to the cell structure 2102. An impact test was conducted using an instron Ceast 9350 drop tower with the impact velocity of 8 m/s. The self-folding structure 2102 folds into a compact configuration and the model module case wall 2110 provided a reaction stress of 4 MPa.

The structures shown in FIGS. 18-21 can be self-folding or self-unfolding upon mechanical loading. The folding/unfolding of battery-cell structure is achieved through deformation, buckling, displacement, and/or rotation of battery cells and/or connectors and fixtures. The battery cells can be connected by connectors or holders, or can be freely jointed in a self-folding/unfolding configuration. The connectors or holding fixtures can be hollow tubes, profiled hollow components, sheets, triggers, springs, dashpots, or any combination of the above components. The self-folding/unfolding configuration that aids cells or cell structures to deform, move, or rotate can include arrays, X-shaped structures, V-shaped structures, S-shaped structures, Z-shaped structures, O-shaped structures, triangles, prismatic structures, tubes or tube-shaped structures, umbrella-shaped structures, or any combination of these geometries.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In addition, the systems and techniques described above can be combined with the subject matter of the patent application entitled, "Functional Additives For Mitigating Thermal Runaway in Lithium Ion Batteries", filed on the same day as this application and incorporated by reference in its entirety herein. For example, the methods and systems disclosed herein enable a non-chemical approach to provide low-cost, robust, and multifunctional battery systems for electric vehicles.

Particular embodiments of the invention have been described. Other embodiments are within the scope of the following claims. For example, the actions recited in the claims can be performed in a different order and still achieve desirable results.

What is claimed is:

1. A battery system comprising:
   a load bearing structure comprising:
      battery cells;
      connecting elements connecting each of the battery cells to at least one of the other battery cells to form pairwise units, the connecting elements configured to allow the connected battery cells to rotate with respect to one another; and
      at least one mechanical switch; and
   an electrical connection coupled to the battery cells of the load bearing structure.

2. The battery system of claim 1, wherein the at least one mechanical switch is configured to transmit energy to the battery cells, the battery cells configured and arranged to absorb energy when changing from a first arrangement into a second arrangement upon mechanical loading, wherein the second arrangement produces a reaction stress different from the first arrangement.

3. The battery system of claim 2, wherein the second arrangement is smaller than the first arrangement in a first dimension parallel to a direction of the mechanical loading, and the second arrangement is larger than the first arrangement in a second dimension different from the first dimension.

4. The battery system of claim 2, wherein the second arrangement comprises a truss and extends over a larger volume than the first arrangement, and the second arrangement is configured to provide a higher reaction force than the first arrangement.

5. The battery system of claim 2, wherein the load bearing structure is configured to change to the second arrangement when impacted at a first impact velocity, and the structure is configured to change to a third arrangement when impacted at a second impact velocity, the second impact velocity being higher than the first impact velocity.

6. The battery system of claim 5, wherein the at least one mechanical switch is configured to be crushed at or above the second impact velocity and the structure is configured to produce a higher reaction stress in the third arrangement than in the first arrangement or the second arrangement.

7. The battery system of claim 5, wherein the at least one mechanical switch is configured to slide the plurality of battery cells in a direction different from the mechanical loading to form the second arrangement.

8. The battery system of claim 2, comprising:
   a container configured to receive the battery cells in the second arrangement;
   module components parallel to the battery cells in the first arrangement; and/or
   a cell releasing system connecting the module components to the container, wherein the battery cells are configured to slide out of the module components through the cell releasing system and into the container upon mechanical loading.

9. The battery system of claim 2, further comprising a container configured to receive the battery cells in the second arrangement, wherein a width of the container is configured to change to accommodate the battery cells in the second arrangement.

10. A battery system comprising:
    a first pairwise unit of battery cells connected by a first mechanical connection;
    a second pairwise unit of battery cells connected by a second mechanical connection, wherein the first pairwise unit is connected to the second pairwise unit by at least one mechanical connection to form a truss unit; and
    at least one mechanical switch positioned between the first and the second pairwise units of battery cells, the at least one mechanical switch configured to transmit energy to the truss unit upon mechanical loading,
    wherein the truss unit is configured to change from a first arrangement to a second arrangement upon receiving energy from the at least one mechanical switch, the first arrangement is bigger than the second arrangement along a first dimension, and the first arrangement is smaller than the second arrangement along a second dimension different from the first dimension.

11. The battery system of claim 10, wherein each of the mechanical connections are configured to allow the connected battery cells to rotate with respect to each another.

12. The battery system of claim 11, wherein each of the mechanical connections are at least one of a free-rotational hinge configured to rotate freely and a moment-resistance hinge configured to provide reaction moments/forces while rotating.

* * * * *